(12) United States Patent
Su

(10) Patent No.: US 12,307,617 B2
(45) Date of Patent: May 20, 2025

(54) SEARCHABLE OBJECT LOCATION INFORMATION

(71) Applicant: STREEM, LLC, Portland, OR (US)

(72) Inventor: Huapeng Su, San Jose, CA (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/850,118

(22) Filed: Jun. 27, 2022

(65) Prior Publication Data

US 2023/0290090 A1 Sep. 14, 2023

Related U.S. Application Data

(60) Provisional application No. 63/318,712, filed on Mar. 10, 2022.

(51) Int. Cl.
| | |
|---|---|
| *G06T 19/20* | (2011.01) |
| *G06T 7/73* | (2017.01) |
| *G06T 19/00* | (2011.01) |
| *G06V 10/56* | (2022.01) |
| *G06F 3/04842* | (2022.01) |

(52) U.S. Cl.
CPC .............. *G06T 19/20* (2013.01); *G06T 7/74* (2017.01); *G06T 19/006* (2013.01); *G06V 10/56* (2022.01); *G06F 3/04842* (2013.01); *G06T 2200/24* (2013.01); *G06T 2219/2012* (2013.01)

(58) Field of Classification Search
CPC ......... G06T 19/20; G06T 7/74; G06T 19/006; G06T 2200/24; G06T 2219/2012; G06V 10/56; G06F 3/04842
See application file for complete search history.

(56) References Cited

U.S. PATENT DOCUMENTS

| | | | | |
|---|---|---|---|---|
| 8,705,893 | B1 * | 4/2014 | Zhang | G06T 7/33 |
| | | | | 382/285 |
| 2008/0229194 | A1 * | 9/2008 | Boler | G06Q 30/0601 |
| | | | | 715/700 |
| 2009/0222127 | A1 * | 9/2009 | Lind | G06Q 30/0601 |
| | | | | 705/26.1 |
| 2010/0079369 | A1 * | 4/2010 | Hartmann | G06F 3/03543 |
| | | | | 345/163 |
| 2018/0315162 | A1 * | 11/2018 | Sturm | H04N 13/239 |
| 2018/0330184 | A1 * | 11/2018 | Mehr | G06T 17/00 |
| 2020/0151953 | A1 * | 5/2020 | Strater | G06F 30/10 |
| 2020/0312013 | A1 * | 10/2020 | Dougherty | G06V 20/64 |

(Continued)

OTHER PUBLICATIONS

Augmented Reality, "Introducing RoomPlan", https://developer.apple.com/augmented-reality/roomplan/.

(Continued)

*Primary Examiner* — Md Saiful A Siddiqui
(74) *Attorney, Agent, or Firm* — Schwabe Williamson & Wyatt

(57) ABSTRACT

Embodiments herein may relate to generating, based on a three-dimensional (3D) graphical representation of a 3D space, a two-dimensional (2D) image that includes respective indications of respective locations of one or more objects in the 3D space. The 2D image may then be displayed to a user that provides user input related to selection of an object of the one or more objects. The graphical representation of the object in the 2D image may then be altered based on the user input. Other embodiments may be described and/or claimed.

20 Claims, 17 Drawing Sheets

(56) References Cited

U.S. PATENT DOCUMENTS

| | | | |
|---|---|---|---|
| 2021/0225043 A1* | 7/2021 | Tang | G06T 7/50 |
| 2021/0319228 A1* | 10/2021 | Fleischman | G06F 18/22 |
| 2023/0092282 A1* | 3/2023 | Boesel | G06F 3/04845 |
| | | | 715/849 |
| 2024/0062279 A1* | 2/2024 | Scully | G06F 3/013 |

OTHER PUBLICATIONS

Apple Developer, video entitled "Create Parametric 3D Room Scans with RoomPlan", link: https://developer.apple.com/videos/play/wwdc2022/10127/.

Apple Developer, RoomPlan Beta, "Create a 3D Model of a Room by Interactivity Guiding People to Scan Their Physical Environment Using a Device's Camera", https://developer.apple.com/documentation/roomplan.

* cited by examiner

NON-TRANSITORY COMPUTER-READABLE STORAGE MEDIUM
1702

PROGRAMMING INSTRUCTIONS 1704
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 17

SEARCHABLE OBJECT LOCATION INFORMATION

CROSS-REFERENCE TO RELATED APPLICATIONS

The present application claims priority to U.S. Provisional Patent Application No. 63/318,712, filed on Mar. 10, 2022, the contents of which are incorporated by references in their entirety.

BACKGROUND

Legacy systems may be able to scan a room and present information regarding the environment to a user. However, in many legacy systems, such a scan may have limited information or value for understanding the contents of the room.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIG. 17 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
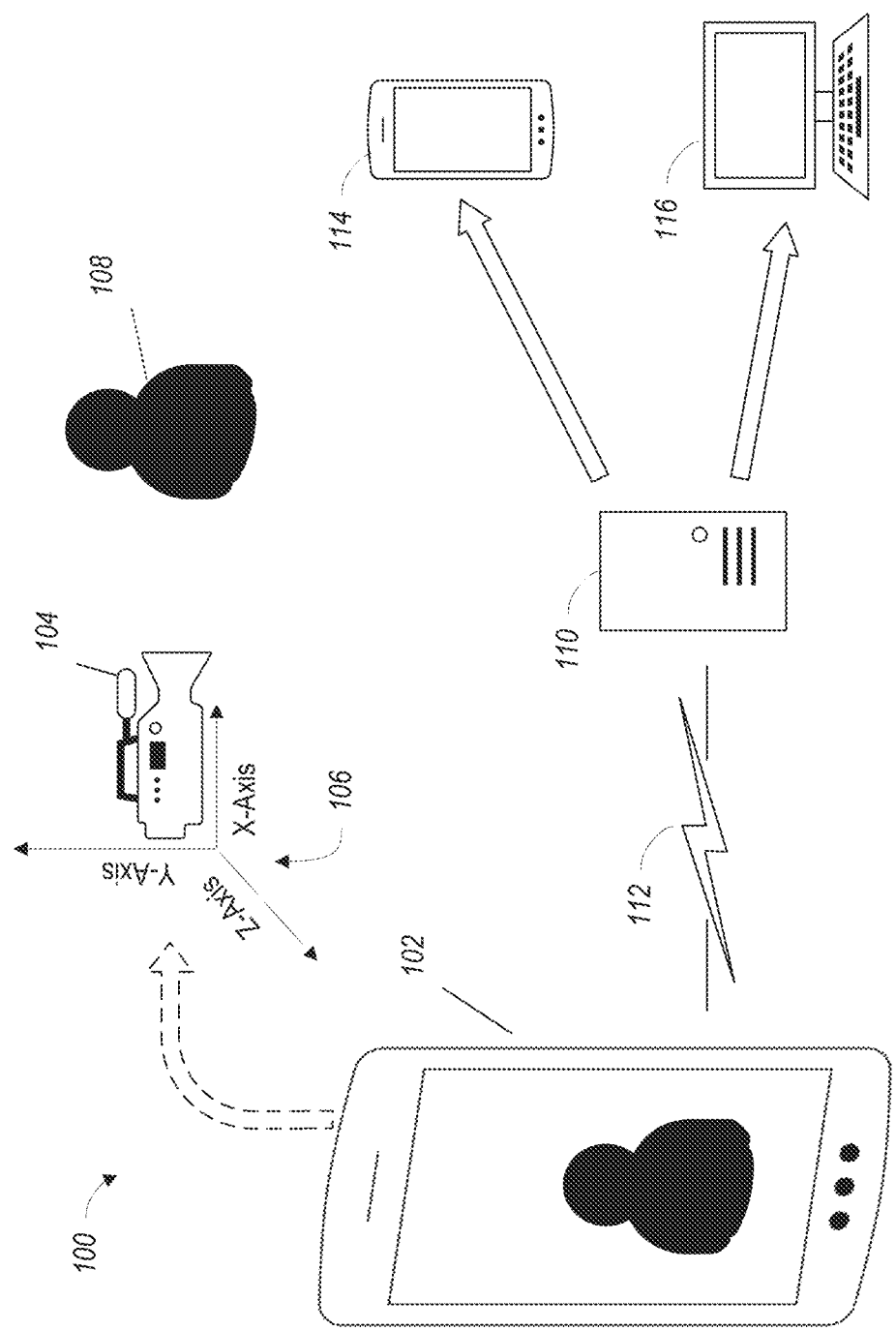
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As communications technology continues to advance, modern systems can additionally capture and/or transmit spatial data associated with video and audio being captured and transmitted. Alternatively or additionally, systems can derive spatial data using various photogrammetric techniques, through which three-dimensional spatial relationships can be ascertained. Depending upon the capabilities of a capturing device, depth data may be directly measured or calculated on the fly from captured video, possibly in conjunction with spatial position sensors that may be equipped to the capturing device. For example, most modern smartphones are equipped with an array of sensors beyond cameras and microphones; a modern smartphone may also include depth sensing, such as a LiDAR imager or rangefinder, and motion sensing, such as multi-axis gyroscopes and accelerometers. Combined with image analysis and photogrammetry techniques, as well as techniques such as simultaneous localization and mapping (SLAM) that allow integration of depth and motion data to enable a device to both measure its environment and know its position within the environment, these array of sensors allow for the relatively accurate capture and/or calculation of depth information for a captured scene.

This depth information can be used to construct a mesh, essentially by "connecting the dots", viz. repeatedly connecting sets of three depth points together with edges to form a mesh of triangles that approximates the 3D space from which the depth information was obtained. As used herein, the term "3D space" may be used to represent a physical location at which the scan is being performed (e.g., a room, a hallway, an open area, etc.)

The depth information may be obtained by using a suitably equipped device to scan or capture the 3D space; this may be accomplished by panning and/or moving the device with its video camera and any depth scanning sensors active so that the video camera and sensors capture a 360 degree view of the space. Further, because the position of the capturing device within the 3D space can be known relative to the depth data and determined with respect to each successive frame of video simultaneously captured by the device, extracted video frames can be mapped onto the 3D mesh to create a relatively realistic approximation of the 3D space. However, this mesh recreation may be agnostic with respect to its contents, which are understood only as a 3D mesh. The nature of the various constituent components that comprise the 3D space may be unclear from the mesh and texture.

For example, if the goal is to capture the layout of a particular 3D space that is bounded by walls, such as a room, the dimensions of the bounding walls may need to be determined to create an accurate layout. However, various pieces of furniture and/or other objects may intervene between the camera's position and a boundary wall. While a mesh obtained from a point cloud and textured with video frames may allow for visual discernment of the wall by a user, the wall itself may only be visible within the mesh insofar as it is not occluded by objects. Furthermore, depending on how closely a particular object is placed next to a wall, it may be difficult to distinguish the wall from the object. In either case, it may be difficult for a system that generates a 3D mesh to extrapolate the actual configuration of the room walls and/or to generate an accurate layout of the room. Further, some features such as windows or doors may not be readily distinguishable from a point cloud, as the windows or doors may appear in essentially the same plane as or part of their wall(s). It may nevertheless be desirable to indicate the presence of these windows or doors on a layout depicting the room. Still further, a user may only be interested in the layout of a portion of an area, e.g. an area of interest, and so may only wish to scan a small portion of a comparatively large space. Such partial scanning can result in an "open loop" scan problem, where the system generating the layout cannot accurately ascertain the room layout due to an incomplete scan that does not capture all boundaries that would otherwise be captured in a 360 degree pan of the room.

In some cases it may be desirable for a user interface to display the locations of different objects in a user-manipulable manner. For example, the scan itself may be of a 3D 3D space, but it may be desired for the display of the scan to be a two-dimensional (2D) or 3D representation (e.g., an image) of the 3D space. Further, it may be desirable for the locations of various objects with the 3D space to be displayed in either the 2D or 3D image. Finally, it may be desirable for a user to be able to search for a specific object (e.g., a "door," a "window," etc.) within the 2D or 3D image.

Disclosed embodiments address these limitations by providing systems and methods that can analyze a point cloud or mesh from a device used to scan a 3D space. From analysis of the point cloud or mesh, the systems and methods can identify walls, floors, and/or other boundaries, and distinguish these boundaries from intervening objects. Furthermore, once the scan is complete, a 2D or 3D image of the 3D space may be displayed to a user in a graphical user interface. The user may be able to search for different objects within the representation in one or more of a variety of manners, as described below.

In embodiments, once depth information for a scene has been measured or calculated, this information can be used in conjunction with plane detection algorithms and techniques to generate a 3D "metaverse" of the captured scene. The 3D metaverse is essentially a virtual model of the captured scene, which may be rendered as a mesh, with added metadata that can include physical dimensions of both the space as well as various recognized objects within the scene. Furthermore, with additional knowledge such as camera intrinsics and motion, such as captured by gyroscopes and/or accelerometers, estimations of physical world dimensions can also be ascertained. Thus, the result is a 3D metaverse or virtual reconstruction that reflects the actual physical dimensions and layout of the captured scene, and can be used to take virtual measurements, and recognize objects and/or their locations.

FIG. 1 illustrates an example system 100 that may enable capture of an image or video that includes spatial data. System 100 may include a user device 102. In the depicted embodiment of FIG. 1, user device 102 is a smartphone, which may be implemented as a computer device 1600, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. User device 102 further may include a camera 104 and a spatial position sensor 106 (depicted by a series of axes), which provides information about the spatial position of camera 104. It will be understood that camera 104 and spatial position sensor 106 may be contained within the body of device 102. Camera 104 is used to capture the surrounding environment of device 102, and by extension, the user. The environment may be a 3D space such as a room, and may include one or more three-dimensional objects 108.

Camera 104 may be any camera that can provide a suitable video stream for the intended purpose of user device 102. Where user device 102 is implemented as a smartphone or tablet, camera 104 may be one or more built-in cameras. In other embodiments, such as where consumer device is a laptop, camera 106 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and user device 102. In other embodiments, camera 104 of user device 102 may comprise multiple cameras or similar sensors, where one or more of the sensors may be configured to directly detect depth points, such as a 3D camera, LIDAR, or other suitable depth-sensing technology. In such embodiments, a point cloud of any space captured by camera 104 may be able to be at least partially obtained via direct measurement from the depth-sensing technology.

Spatial position sensor 106 may be configured to provide positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc.

System 100 also includes a central server 110, with which user device 102 is in data communication 112. Central server 110 may act to receive information from user device 102 such as video and depth data, which may be used with process flow 200, discussed below. In some embodiments, user device 102 may handle processing of video and depth information for a captured 3D space, including generation of a metaverse, 3D mesh, and/or layout and estimation of measurements. However, depending upon the specifics of a given implementation, central server 110 may instead carry out some or all processing of the video and depth data to generate a spatial layout and estimation of dimensions of a 3D space captured by the user device 102. User device 102 may either handle a part of the processing, or simply act to acquire data about a 3D space and providing raw or partially processed data to central server 110 for further processing.

Also shown in system 100 are one or more additional user devices 114, 116, which may be smartphones, tablets, laptops, desktops, or other servers. These additional user devices 114, 116 may also be in data communication with central server 110, and so may receive raw or processed data captured by user device 102 and/or a completed layout and estimation of measurements of the 3D space captured by user device 102. User devices 114 and/or 116 may be capable of interaction with the layout and estimations, as well as a generated 3D mesh or metaverse, received from central server 110. Further still, user devices 114, 116 may be enabled to engage in two-way or multi-way interaction with user device 102 through central server 110, with each device commonly working with a generated 3D mesh, metaverse, 2D or 3D layout, and/or estimates of spatial dimensions of the metaverse. It should be understood that devices 114 and 116 are merely examples, and are not indicative of the number or type of devices connected to central server 110; a given implementation may have an arbitrary number of devices connected to central server 110.

User device 102, as mentioned above, is in data communication 112 with central server 110, along with user devices 114 and 116. Data communication 112 may be implemented using any suitable data communication link technology, which may be wired, wireless, or a combination of both. Example communications technologies are discussed below with respect to FIG. 16.

Figure 2:
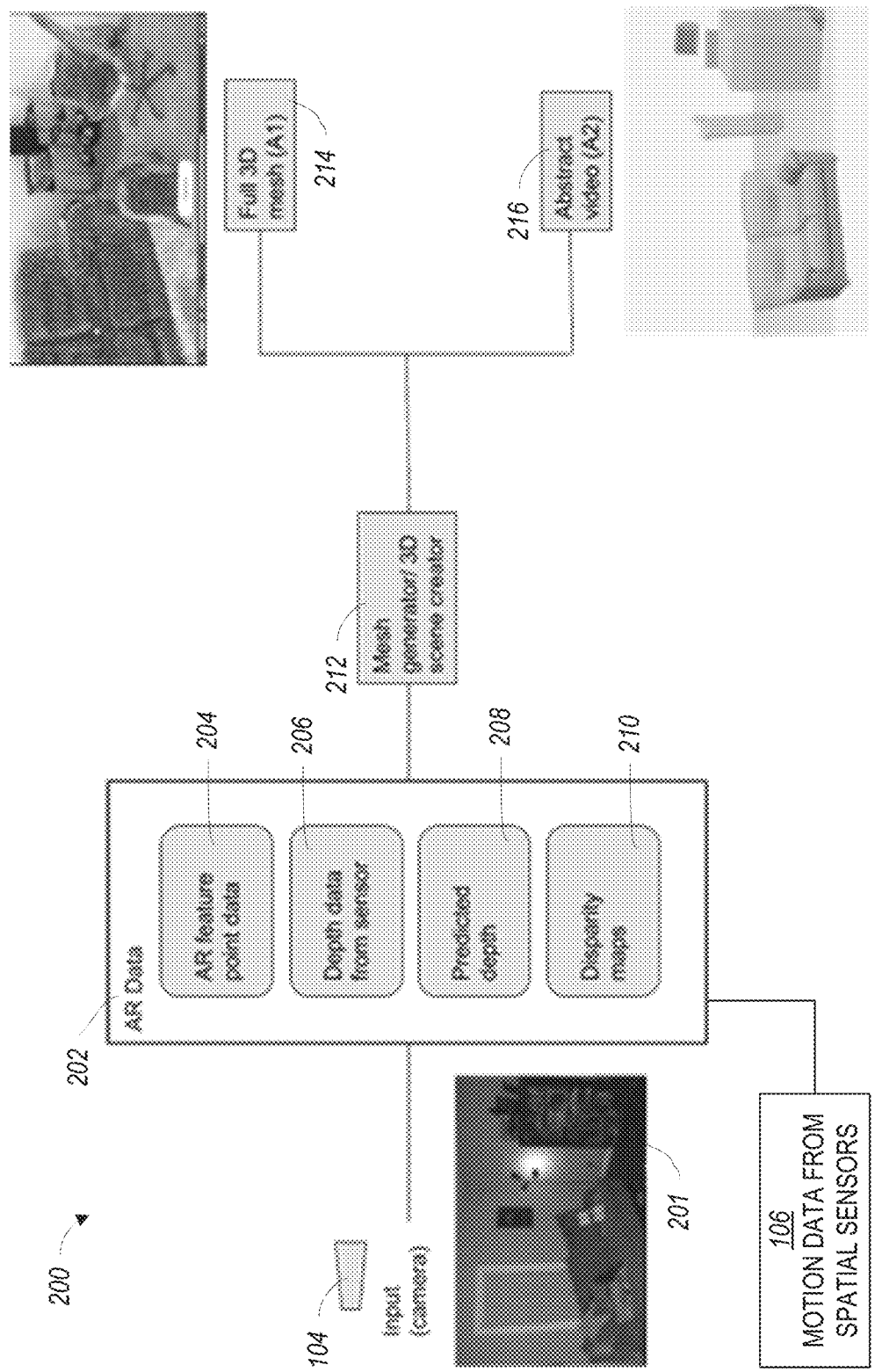
FIG. 2 depicts an example high-level process flow for generating a 3D mesh and virtual reconstruction from a captured video and associated AR data, according to various embodiments.

FIG. 2 depicts an example process flow 200, according to embodiments, for the capture of a video or scan of a 3D space and associated augmented reality (AR) data, and subsequent processing of the video and data into a 3D mesh and abstract video. Process flow 200 may be carried out by one or more components of a system 100, in various embodiments. Initially, a video 201 is captured by an input device, such as a camera 104, along with associated motion data (not depicted). This video 201 is then, in embodiments, partially or wholly processed by the AR API of the capturing device (e.g. ARKit, ARCore) to generate AR data 202, which may be tagged to the video 201. Note that, as used herein, AR data 202 is not data about AR objects. Rather, AR data 202 is point cloud data that corresponds to video 201 that may be useful to create a 3D mesh of the captured 3D space, as well as other useful analysis, such as plane detection and semantic segmentation. Furthermore, in some embodiments, the AR API of the capturing device may include semantic segmentation (discussed in more detail herein) as part of AR data 202.

This AR data 202 may then be used to generate a layout and/or metaverse or virtual representation of the 3D space by a mesh generator/scene creator 212. Finally, the mesh and/or 3D scene can be used to generate a full 3D mesh 214, which includes frames from the video 201 (and/or other sources of relevant images) mapped upon the 3D mesh 214 to generate a relatively realistic model. Additionally, an abstract video 216, which may comprise a layout or metaverse model of the scene captured by the camera 104, may be generated from the detected points in the point cloud. The model can then be used in an interactive fashion. The layout or metaverse model will be discussed in greater detail herein.

In the depicted embodiment of FIG. 2, AR data 202 may be captured contemporaneously with and/or extracted from, video 201, and may be tagged to video 201. AR data 202 may include AR feature point data 204, depth data from the sensor 206, motion data from spatial sensors 106, predicted depth data 208, and/or disparity maps 210. Other embodiments may include additional data types, different data types, or fewer data types. The various types of AR data 202 may be derived from various raw data inputs, including RGB images (such as the sequence of frames of video 201), camera intrinsics and/or camera transforms (such as from camera 104 and/or spatial position sensor 106), 3D feature points, and/or depth images from a depth sensor (LiDAR, stereo camera, etc.), among other types of possible data. RGB images may be extracted from frames of the video captured by camera 104. In addition to motion data from spatial position sensor 106, camera intrinsics can include various known or readily determined properties of camera 104, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 104 is focused relatively far away from the camera position, and/or the camera 104 utilizes a small aperture (relatively high f-stop, such as f/8, f/11, etc.), so as to offer a large depth of field.

Camera transforms can include the various variables necessary to transform between the 3D objects within the field of view of camera 104 and the 2D image plane of the camera 104. Such variables can include information about the spatial location of the capturing device. 3D feature points can include feature points useable by the AR API to create the AR feature point data 204, and may be extracted from video 201, such as various anchor points or features, and/or captured using one or more sensors that are separate from video 201, such as spatial position sensor 106. Depth images can include imaging captured by a depth-sensitive device, such as a LIDAR sensor or infrared range finder, to allow for direct, and potentially more precise, depth measurements of various points within the scene captured by camera 104. Where direct depth measurements are available, data similar to that available for camera 104 may be used (e.g., camera intrinsics and camera transforms) to process the depth measurements and correlate with the images from camera 104.

AR feature point data 204 can include data concerning or otherwise identifying various feature points in the captured scene that are identified by the AR API. These feature points may include anchor points corresponding to various identified features such as edges, points, planes, and other features detected via an object recognition algorithm or other suitable technique, and/or otherwise detected directly or indirectly by a sensor such as spatial position sensor 106. As will be discussed herein, identified features including edges, points, and planes may be used to create a 2D or 3D layout and/or metaverse. Further, these feature points may correspond to segmented portions of the captured 3D scene, such as distinguishing a wall, window, picture, or other planar feature from identified planes such as walls, floor, ceiling, etc.

Depth data from sensor 206 may include the aforementioned direct depth measurements, which may be correlated with identified AR feature point data 204 by the AR API. Corollary to or alternative to depth data from sensor 206 includes predicted depth data 208, which the AR API may derive from any number of techniques, such as machine learning, or photogrammetry and comparison between proximate frames of the captured video. The depth data 206 and 208 may comprise a point cloud that, when interconnected, comprises a 3D mesh, with the points forming the vertices of the mesh triangles.

Similar to such comparison are disparity maps 210, which may include a map indicating the field of view differences between left/right frames in the case of a stereo camera, or proximate frames of the captured video. A disparity map 210 may be useful for computing points in the point cloud, including obtaining predicted depth data 208. It should be understood that proximate frames need not be temporally adjacent in video 201, but rather proximate in terms of field of view: two frames need only simply share at least an overlapping portion of a given scene to be considered proximate for purposes of a disparity map 210.

The mesh generator/scene creator 212, in embodiments, receives the AR data 202 and uses it to generate a 3D mesh, which may then be output as a full 3D mesh 214 and/or an abstract video 216, or layout and/or metaverse. The resulting output from the mesh generator/scene creator 212 can be a full 3D mesh 214, where the RGB image from various frames of video 201 are mapped onto a 3D mesh generated using the AR data. Such a process may be considered a type of texture mapping, where the RGB image of various frames are used as texture maps. The full 3D mesh 214 provides a geometric representation of the captured 3D space. The full 3D mesh 214 can be used for various purposes, such as simulating physical interactions with objects in the 3D space represented by the full 3D mesh 214, taking measurements of the represented environment, later exploration or walkthrough, or another suitable purpose.

Also or alternatively, an abstract video 216 can be output, which may be or include a virtual representation such as a metaverse, and/or a 2D or 3D layout. As with the full 3D mesh 214, such a layout or virtual representation reflects the physical geometry of the captured 3D space, and may include measurements of the captured space that reflect the actual physical dimension of the captured 3D space. In this respect, the virtual representation/layout/metaverse is equivalent in physical dimensions to the captured 3D space, albeit as a digital representation.

It should be understood that, while the foregoing description and subsequent discussions assume that video 201 is in color, e.g. comprised of a plurality of frames that each include an RGB image, other image formats may be utilized. For example, the image data of each frame may instead be expressed using different color systems such as YUV, HSL, CMYK, or another method of expressing color, in alternative embodiments. In still other embodiments, the image information may comprise black and white or greyscale information, with no color information. Further still, other embodiments may utilize a combination of color and greyscale/black and white images.

Figure 3:
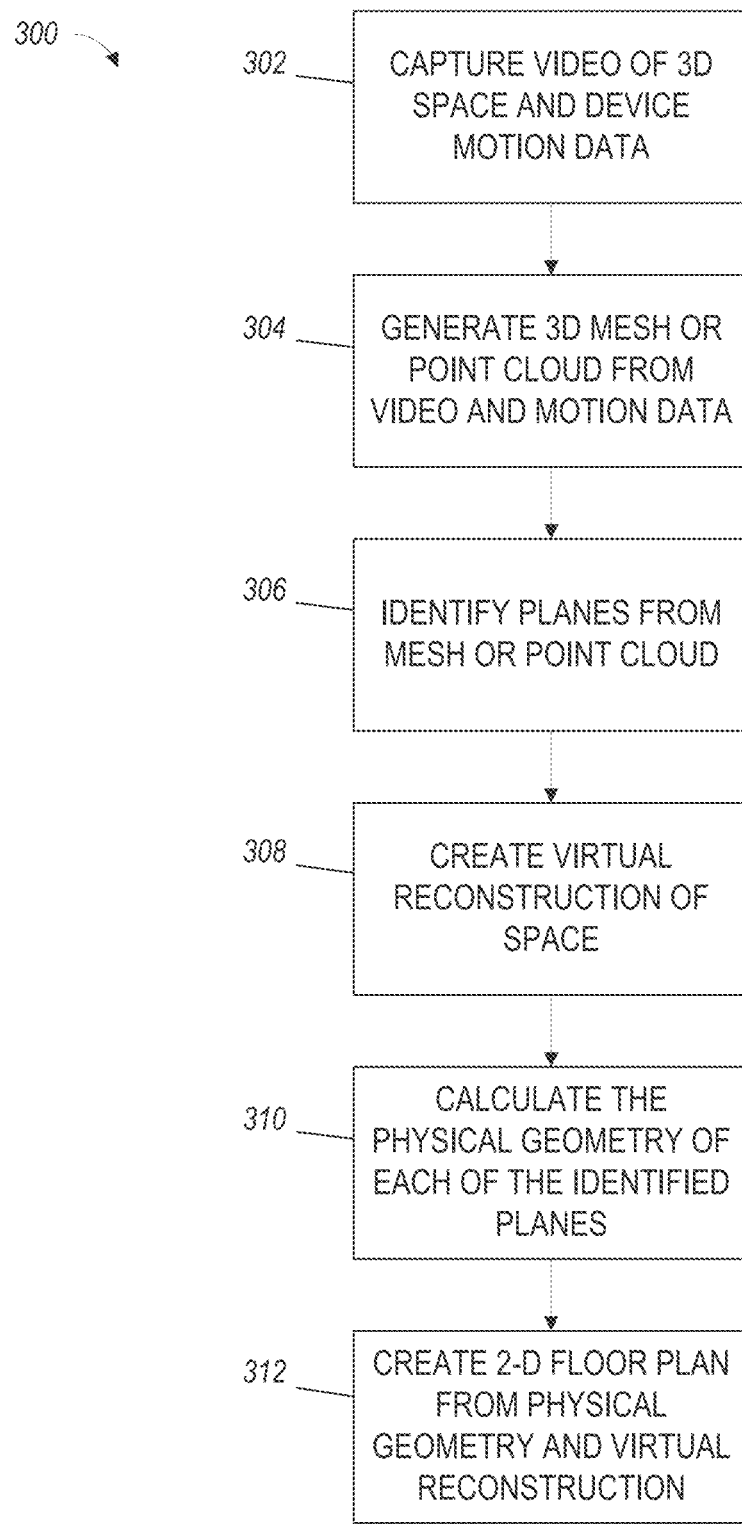
FIG. 3 is a flowchart of the operations of an example method for generating a layout and estimation of measurements of a captured 3D space, according to various embodiments.

FIG. 3 depicts an example method 300 for automatically creating a spatial layout and estimations of physical dimensions of a 3D space. Various embodiments may implement only some or all of the operations of method 300, and each of the operations of method 300 may be performed in whole or in part. Some embodiments may add or omit additional operations, or may change the order of operations as may be appropriate for a given implementation. Method 300 may be carried out in whole or in part by one or more components of system 100.

In operation 302, a video may be captured along with associated AR data, as described above with respect to FIGS. 1 and 2, e.g. spatial data such as a point cloud. The captured video may come from a variety of sources. In some examples, a camera attached to or integrated with a capturing device, such as user device 102 with camera 104, is used to capture the video. In other examples, a different device or devices may be used to capture the video that are separate from the capturing device. The AR data may come from, in some examples, other sensors as described above with respect to FIGS. 1 and 2, such as spatial position sensor 106 on a user device 102. In embodiments, the video and AR data are captured contemporaneously to ensure appropriate association between the AR data and corresponding video frames. The video and associated AR data may be captured at a previous time, and stored into an appropriate file format that captures the video along with the raw feature points and motion data. Various operations of method 300 may then be performed on the stored video and associated data in post-processing.

In operation 304, a point cloud of depth data, viz. a cloud of points each with positional data in three dimensions with respect to a predetermined reference, is obtained from the captured video and possibly AR data, also as described with respect to FIGS. 1 and 2. In some embodiments, operation 304 may be performed at least in part by an AR API located on the capturing device, as discussed above with respect to device 102. In various embodiments, the point cloud may further be processed to generate a 3D mesh, such as by repeatedly connecting each of the points in the point cloud into groups of three to form a mesh of triangles. Each of the points then becomes a vertex for one or more triangles, with edges of the various triangles formed by the connection between two adjacent points. In some embodiments, the depth points or the 3D mesh may be at least partially obtained using simultaneous localization and mapping (SLAM), or another suitable technique, which may be carried out on the device by the AR API.

In embodiments where the video is provided as a file from a past capture, the AR feature points may be stored with the video, and correlated to each video frame. In other embodiments, the AR feature points may be calculated from a raw video without associated AR data using photogrammetric techniques.

In operation 306, the resulting point cloud and/or 3D mesh is analyzed using a plane detection algorithm. Any suitable plane detection algorithm now known or later developed may be employed, with the selection of algorithm depending upon the needs of a given embodiment. Some considerations in algorithm selection may include where the algorithm is performed, e.g. the user device or a central server, such as central server 110, and available resources for the system that performs the algorithm. Other considerations may include the accuracy of the algorithm in detecting planes within the point cloud or 3D mesh. The result of the algorithm is an indication of identified planes within the point cloud or 3D mesh, namely, point cloud planes. These planes may indicate detection, and location within the point cloud, of various planes within the captured 3D space, such as walls, floors, ceilings, partitions, doors, windows, paintings, and/or other objects that may include substantially planar features such as tables, monitors, desks, islands, cabinets, and/or other similar objects, to name a few non-limiting examples.

In operation 308, in embodiments, the point cloud planes identified in operation 306 are used to generate a virtual reconstruction of the 3D space captured by the user device in operation 302. By using the identified planes that correspond to boundaries of the 3D space, various objects that may be found within the space can essentially be ignored or removed. This virtual reconstruction may be considered a 3D layout, as it is essentially a reconstruction of the 3D space but without texture mapping or the insertion of various objects within the space. For example, the plane detection algorithm may detect walls and the floor of a 3D space, but not detect objects such as plants, chairs, sofas, machinery, or other substantially non-planar objects. Furthermore, these objects would present with depth data in their constituent points that are closer than boundary layers (walls, floor, ceiling), which would typically have depths detected as the most distant from the position of the capturing device. Likewise, objects with relatively large planar surfaces, such as beds or tables, that would likely present as planes, can similarly be rejected as typically closer to the capturing device, than boundaries. Thus, the boundary layers can be selected over any other closer detected object, and used to create the virtual reconstruction or 3D layout.

In some embodiments, the detected objects may be reinserted into the virtual reconstruction, but may be in an abstract form, to allow for the 3D layout and/or virtual reconstruction to more accurately reflect the layout of the 3D space at time of capture. In still other embodiments, frames from the video captured by the user device may be mapped onto the virtual reconstruction.

In operation 310, the virtual construction may then be used to determine the physical geometry of the captured 3D space, including actual physical measurements of the various identified planes. These measurements may be assigned to various aspects of the virtual construction, such as via metadata or other tagging, or may be stored separately. Measurements that may include lengths of edges, areas of surfaces, volumes of spaces, distances between objects, and/or any other measurements that could be obtained or approximated from actually measuring the physical 3D space. Thus, the virtual construction approximates or matches the physical size of the captured 3D space. Measurements taken in the virtual construction, which is of an identical scale to the captured 3D space, will be identical, or substantially identical to if such measurements had been made of the actual 3D space using traditional measurement tools such as a ruler, tape measure, laser measure, rangefinder, etc.

In operation 312, the virtual construction and/or point cloud could be used to determine a 2D floor plan and associated estimation of measurements. The 2D floor plan may include or be used to obtain measurements as with the 3D space. Methods for creating a 2D floor plan will be described in greater detail herein.

Depending upon the capabilities of an implementing system or device, method 300 may be performed progressively while the video is being captured, or may be performed on a complete captured video and associated AR data.

Figure 4:
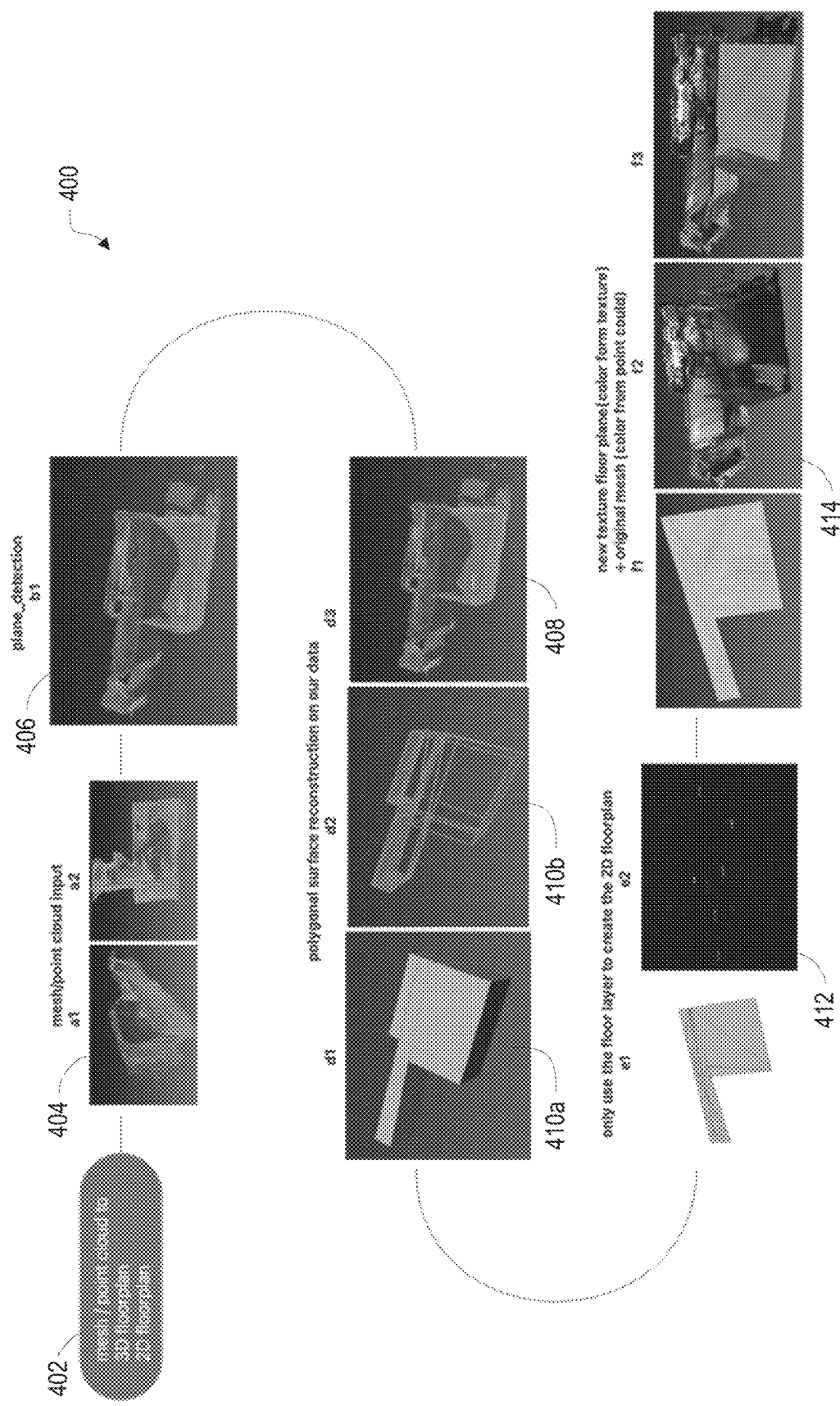
FIG. 4 illustrates an example process flow for generating a layout and measurement estimation of a captured 3D space, according to various embodiments.

Turning to FIG. 4, an example process flow 400 of the generation of a virtual reconstruction and estimation of measurements of a captured 3D space according to some embodiments is depicted. Process flow 400 roughly follows the operations of method 300, discussed above, and may be performed by a system 100. As with method 300, portions of the process flow may be omitted, changed, reordered, or additional actions added, depending upon the needs of a given implementation or embodiment.

In block 402 of the example flow, a determination is made whether the point cloud or 3D mesh will be used to generate a 3D floor plan (or layout) or a 2D floor plan (or layout). The determination may be made from a selection provided by a user of a system implementing process flow 400, by a predetermined configuration of the process flow 400 or implementing system, by an automatic determination based upon a context or similar predetermined factors, or by any other suitable method of determining which type of floor plan or layout would be appropriate or needed, depending on the needs of a given embodiment.

In block 404 of the example flow, a point cloud or 3D mesh is received, such as from a device like user device 102.

The point cloud, as discussed above with respect to FIG. 3 and method 300, may be represented as a collection of points defined with x, y, and z positions, or may be vertices of a connected 3D mesh. As depicted in FIG. 4, the point clouds of images a1 and a2 represent scans of a captured 3D volume.

In block 406 of the example flow, the point cloud or vertices of the 3D mesh are passed through a suitable plane detection algorithm to detect various planes that are represented in the point cloud. This operation was described above in method 300, in operation 306. As can be seen in FIG. 4, the result of the plane detection algorithm is the identification of surfaces such as the walls, floor, and other major planar surfaces of the captured 3D space.

Next, in blocks 408 and 410 of the example flow, the point cloud and detected planes are passed through a polygonal surface reconstruction algorithm. The point cloud is depicted in image d3 of block 408, which illustrates the result of plane detection from block 406 and, in some embodiments, object detection. The result of the polygonal surface reconstruction algorithm on image d3 is a 3D layout, as illustrated in images d1 and d2 in blocks 410a and 410b, respectively. Image d1 of block 410a illustrates the detected planes as solid faces, while image d2 of block 410b illustrates the frames in a wireframe, for two different possible 3D layout views. Any polygonal surface reconstruction algorithm that is now known or later developed may be employed that is suitable for a given embodiment.

In block 412 of the example flow, the floor layer of the 3D layout is identified, and used to construct a 2D floorplan or layout. The floor layer may be identified based on its underlying point cloud information and distinguished as orthogonal from the various planes that comprise the walls. Furthermore, various objects located within the 3D space may be identified as in contact with the floor plane, further allowing the floor layer to be identified and distinguished from other identified planes and objects. Once identified, indicated in image e1, measurements may be obtained of its perimeter edges, illustrated in image e2, which shows the edges of the floor plane in outline. In other embodiments, the floor plane may be identified as the layer that has the greatest area. The measurements obtained for the floor plane may be in any suitable units, e.g. metric: meters, centimeters, millimeters, kilometers, etc.; or English: inches, feet, yards, miles, etc., depending upon a particular embodiment and/or the preferences of a user of a system implementing process flow 400. Area may also be determined, expressed as a square of a measurement unit, as will be understood. Importantly, the relative values assigned to the point cloud points or 3D mesh vertices allow the various measurements to approximate or reflect the actual real-world physical measurements of the captured 3D space.

In block 414 of the example flow, once the floor plane has been identified in block 412, the floor plane may be selectively and optionally textured by mapping an image onto the identified plane. A 3D mesh generated from the point cloud underlying the floor plane may have surface irregularities stemming from imprecision in the scan of the 3D space, device errors, and/or other sources. Identifying the floor plane and expressing in the 3D layout (and 2D layout) can essentially smooth the floor plane, as the plane is a reconstruction of the 3D space, rather than a 3D mesh that is generated from the point cloud. This smoothing allows for a relatively seamless mapping of an image onto the plane, which can be done without image distortion or warping that could otherwise result when a 3D mesh with irregularities is texture mapped. The source of the texture may be an arbitrarily selected image, as illustrated in images f1, for a 2D layout, and f3, for a 3D layout. Alternatively, the source of the texture may be one or more images captured in the original video giving rise to the point cloud, for a relatively realistic, yet virtual recreation of the scanned space, as illustrated in image f2. Mapping the plane with the one or more images, as will be understood, results in a floor plane that looks identical to the actual scanned or captured 3D space.

Figure 5:
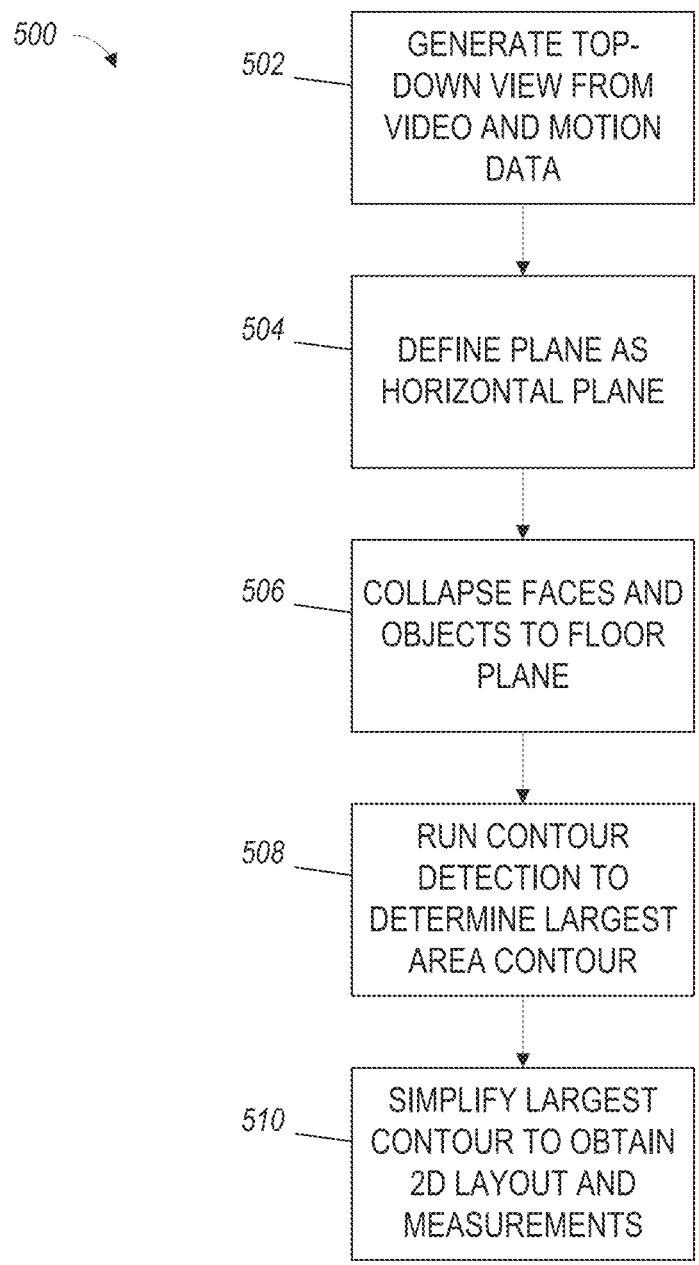
FIG. 5 is a flowchart of the operations of an example method for generating a 2D layout and estimation of measurements of a captured 3D space, according to various embodiments.

FIG. 5 depicts an example method 500 for automatically generating a top-down view spatial layout and estimation of physical dimensions of a 3D space. Various embodiments may implement only some or all of the operations of method 500, and each of the operations of method 500 may be performed in whole or in part. Some embodiments may add or omit additional operations, or may change the order of operations as may be appropriate for a given implementation. Method 500 may be carried out in whole or in part by one or more components of system 100. In some embodiments, method 500 may at least partially be embodied or executed as part of operation 312 of method 300 and/or blocks 412 and 414 of process flow 400.

In operation 502, a top-down view is generated from the video and motion data, per extraction of point cloud/depth information, as discussed above with respect to FIG. 2 and process flow 200. The top-down view orients the point cloud so that the floor plane is essentially most distant from other structures scanned in the captured 3D space. As the capturing device is typically equipped with motion sensors such as gyroscopes and accelerometers, in some embodiments this motion information can be used to determine the orientation of the device relative to the captured 3D space, and so allow the point cloud to be reoriented to a top-down perspective. In other embodiments, a plane detection algorithm may be used to identify all planes from the point cloud or 3D mesh, such as in operation 306 of method 300 and block 406 of process flow 400.

In operation 504, one of the identified planes is designated as a horizontal, viz. floor plane. In some embodiments, the plane the furthest from the point of view of the top-down view, such as a virtual camera or view oriented facing down, is designated as the horizontal plane. Once a horizontal plane has been identified, in operation 506 of the example embodiment, intervening objects are collapsed or projected to the horizontal surface. Objects may be identified as faces or facets that have a shallower depth than the identified horizontal plane, that is, that have depth points that are closer to the view or camera position than the identified horizontal plane.

In operation 508, once the horizontal plane has had all objects and facets projected to it, a contour detection algorithm may be run on the resulting collapsed top-down view. The algorithm may return a number of different contours, which can variously reflect different parts of the horizontal plane with projected objects or facets. The contour identified with the largest area is then taken as the 2D layout or floorplan, as it is most likely to reflect the boundaries defining the outer perimeter of the horizontal plane. Any contour detection algorithm now known or later developed may be employed that is suitable for the needs of a given embodiment.

Finally, in operation 510, the identified largest contour may be simplified, to smooth out any ripples or distortions in the identified contour edges that may have resulted from scanning inaccuracies or errors, and yield straightened edges. Thus simplified, the 2D layout may then be used to obtain various measurements, similar to those described above in operation 312 of method 300 and/or block 412 of process flow 400.

Figure 6:
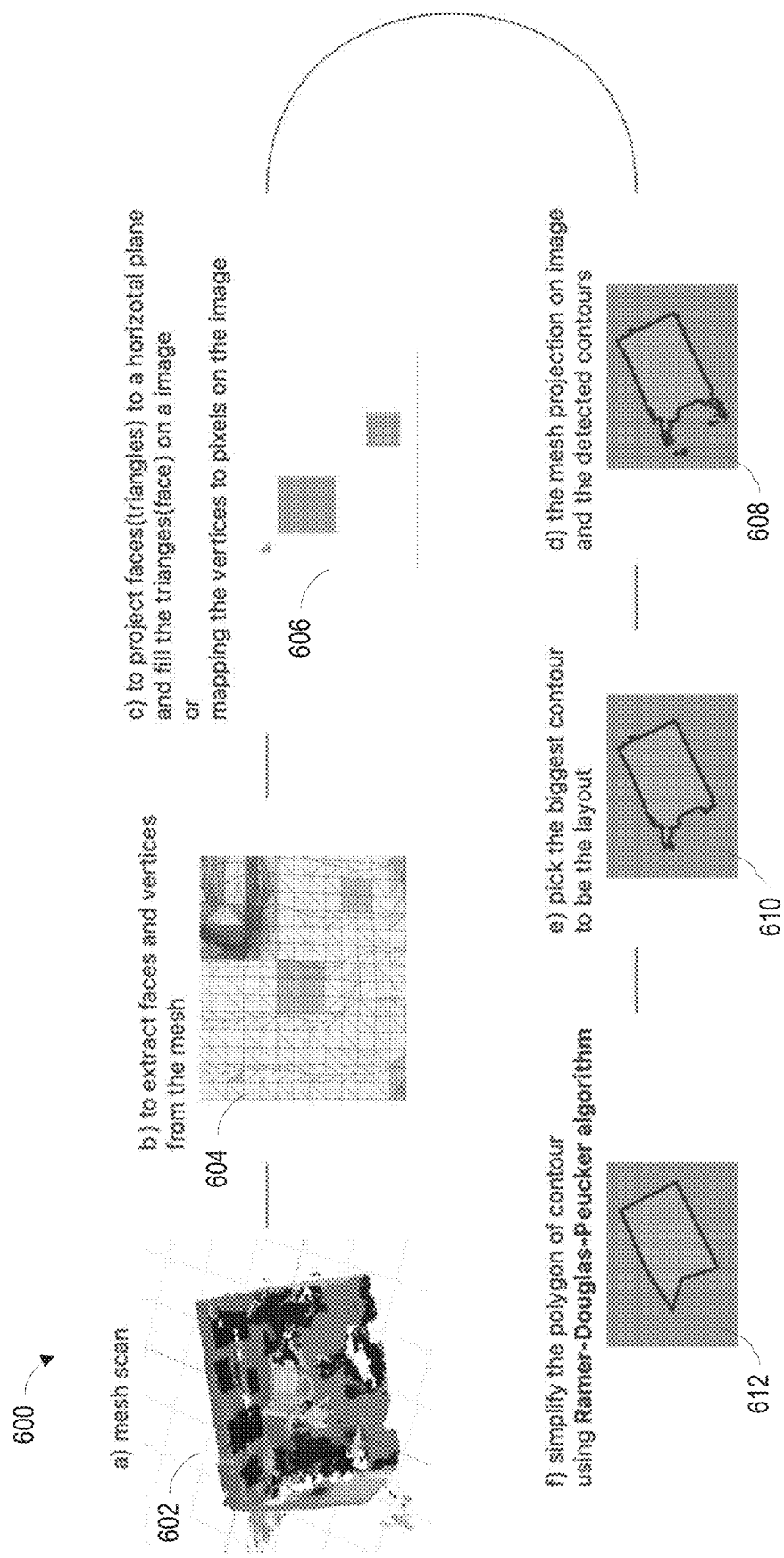
FIG. 6 illustrates an example process flow for generating a 3D layout and measurement estimation of a captured 3D space, according to various embodiments.

FIG. 6, an example process flow 600 of the generation of a virtual reconstruction and estimation of measurements of a captured 3D space according to some embodiments is depicted. Process flow 600 roughly follows the operations of method 500, discussed above, and may be performed by a system 100. As with method 500, portions of the process flow may be omitted, changed, reordered, or additional actions added, depending upon the needs of a given implementation or embodiment.

In block 602 of the example flow and similar to block 404 of process flow 400, a point cloud or 3D mesh is received, such as from a device like user device 102. The point cloud, as discussed above with respect to FIG. 3 and method 300, may be represented as a collection of points defined with x, y, and z positions, or may be vertices of a connected 3D mesh. In the depiction in FIG. 6, the 3D mesh is projected as a top-down view, with the camera perspective approximately looking down from above the scanned 3D space towards the floor. As discussed above in the discussion of operation 502 of method 500, camera motion information may be used to transform the perspective of the point cloud to approximate an overhead camera position. Stated another way, the data of each point in the point cloud may be translated to values that approximate those that would result had the user device been positioned above the 3D space.

In block 604 of the example flow, various faces and vertices are extracted from the 3D mesh. These faces and vertices reflect the depth data captured from the scan of the 3D space, including any objects and boundaries, viz. walls, floor, etc., located within the space and positioned between the camera and the space boundaries. One of the identified planes is designated as a horizontal plane, and objects and faces within the space are projected onto the horizontal plane in block 606 of the example flow. As a result, the 3D mesh is essentially collapsed to a 2D plane, with vertices of the features mapped to pixels on the plane. In embodiments, these pixels then represent the various projected faces and vertices. The resultant horizontal plane essentially approximates a 2D picture or image that would be obtained were the scene to be photographed from above.

In block 608 of the example flow, a contour detection algorithm identifies a variety of contours that result from both the boundaries of the captured space as well as the various collapsed/projected objects and facets. Following identification of contours, in block 610 of the example flow, the contour with the largest area is identified and designated as the 2D layout. Blocks 608 and 610 correspond to operation 508 of method 500, in embodiments.

Finally, in block 612 of the example flow, the identified largest contour is simplified, corresponding to operation 510 of method 500. One possible algorithm that can be utilized is the Ramer-Douglas-Peucker algorithm, which simplifies curves by reducing the number of defining points. This has the effect of smoothing out complexities of a curve, which further helps simplify the process of obtaining measurements. As discussed above with respect to operation 510, any other suitable algorithm may be employed, depending upon the needs of a given implementation.

Figure 7:
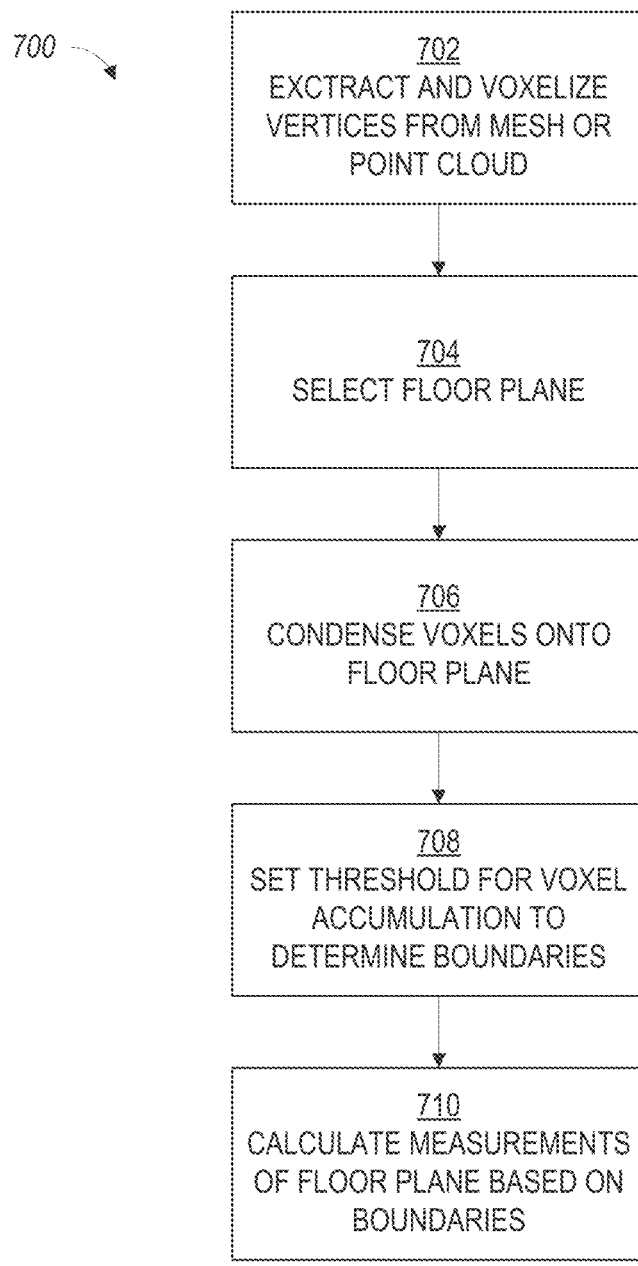
FIG. 7 is a flowchart of another example method for generating a 2D layout and automatically determining floor plane boundaries, according to various embodiments.

FIG. 7 depicts a second example method 700 for automatically generating a 2D spatial layout and estimation of physical dimensions of a 3D space. Various embodiments may implement only some or all of the operations of method 700, and each of the operations of method 700 may be performed in whole or in part. Some embodiments may add or omit additional operations, or may change the order of operations as may be appropriate for a given implementation. Method 700 may be carried out in whole or in part by one or more components of system 100. Method 700 may be employed on an on-the-fly basis, where a 3D mesh is provided and is progressively generated and updated.

In operation 702, a 3D mesh is received, and the vertices of the mesh are extracted and voxelized, viz. each vertex is converted to a block. When performed in real time as a scan is being executed, this operation may be iteratively performed as a given portion of the 3D mesh is updated.

In operation 704, a floor plane is selected, similar to the selection of a horizontal plane in operation 504 of method 500. In operation 706, the voxels above the floor plane are condensed onto the floor plane, similar to projecting faces onto the horizontal plane in operation 506 of method 500. The floor plane can be implemented as a 2D image which may be in color or monochromatic. The voxels, which are essentially 3D versions of pixels, are collapsed into corresponding pixels beneath the voxels, with the intensity of a given pixel reflecting the number of voxels collapsed. In other words, the greater the number of voxels collapsed onto a given pixel, the more intense the pixel will be. Higher objects or objects that project a greater distance from the floor plane will result in more intense pixels, as will be understood.

In operation 708, in embodiments an intensity threshold may be predetermined for distinguishing boundaries of the floor plane. The threshold allows for distinguishing pixels with intensities below the predetermined threshold from those with intensities at or above the predetermined threshold. Exterior boundaries surrounding the floor plane, such as walls, will result in a significantly higher line of pixel intensities that reflect the projection of walls orthogonally from the floor plane. By appropriate selection of the intensity threshold, these boundaries can be determined and distinguished from any other objects contained within the floor plane. Once determined, the boundaries ascertained from the higher-intensity pixels can be used to generate a 2D layout or floor plan.

In operation 710, measurements may be calculated from the 2D layout, similar to the results of operation 312 of method 300, and operation 510 of method 500.

Figure 8:
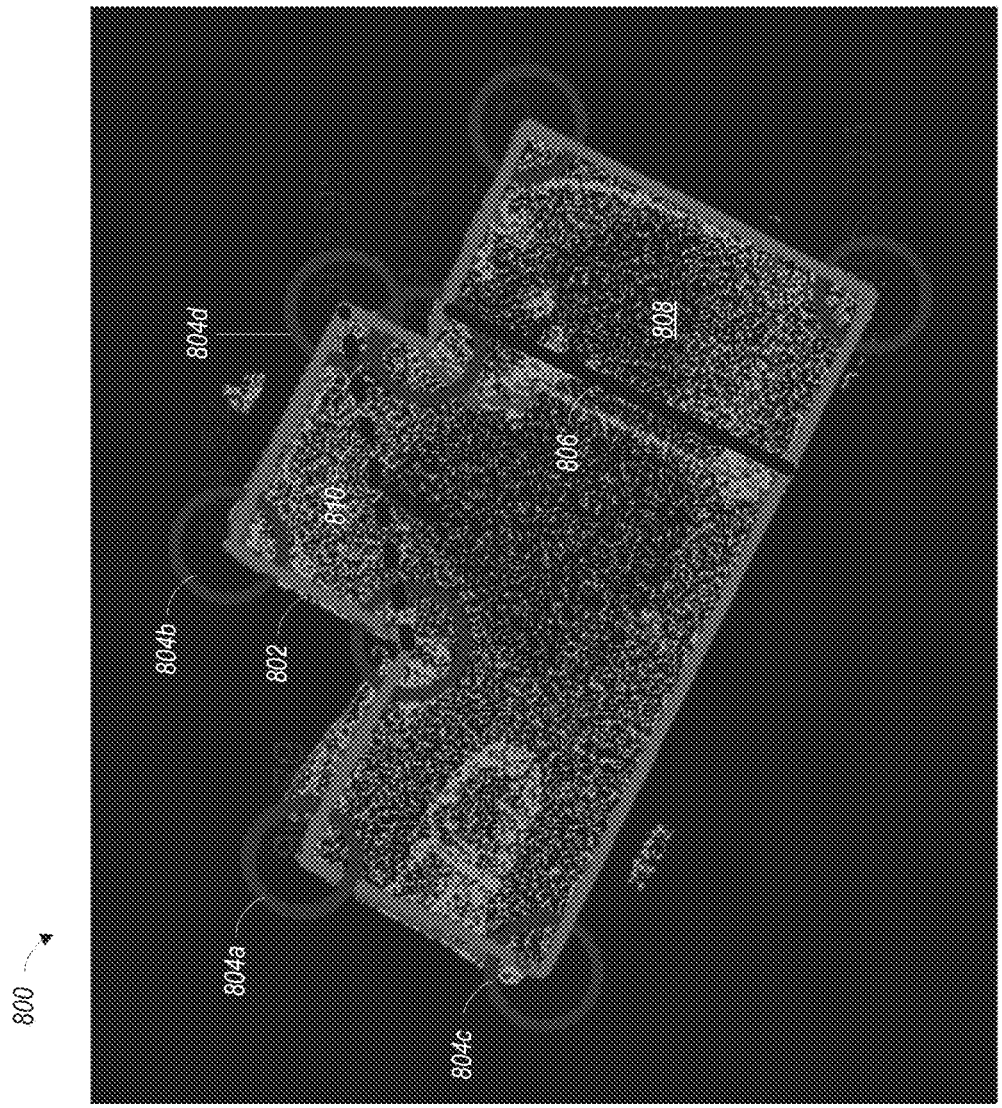
FIG. 8 is a depiction of an example interface depicting a floorplan that may result from the example method of FIG. 7, illustrating identified edges and corners, according to various embodiments.

Turning to FIG. 8, an example floorplan 800 that may result from an embodiment of method 700, following operation 708, is depicted. Floorplan 800 includes a boundary 802, and identified corners, or corner edges 804a-804d. Note that not all corner edges, which are each circled, are specifically labeled. Reference to corner edge 804 should be understood to refer to any of the circled corners. As can be seen in FIG. 8, boundary 802 runs around the perimeter of the image, and demarcates the edges of the floor. In the captured physical 3D space, this boundary would coincide where a wall meets the floor. Each corner edge 804 demarcates where two walls define a corner. Length measurements, such as may be performed in operation 710 of method 700, may be calculated between two adjacent corner edges 804 that define a segment of boundary 802, such as the portion of boundary 802 defined between corner edge 804a and 804c.

It should be appreciated that a given user of a system implementing method 700 may only be concerned with a portion or smaller area of the floorplan 800. In some embodiments, a user may be able partition or designate a smaller area of interest within floorplan 800. In such embodiments, the user may be able to place a line 806 spanning across two points of boundary 802 to demarcate a region of interest 808. This region of interest 808 may be used for calculation of its area and specific measurements from additional corners that may be defined where the line 806 intersects or meets with boundary 802. It should further be understood that a given line 806 need not terminate at both ends on boundary 802. In some implementations, line 806 may terminate between other user-placed lines, or between boundary 802 and another user-placed line. In still other embodiments, line 806 may also be drawn as a curve or arbitrary path to allow for more complex measurements.

Owing at least in part to the automatic nature of the edge/boundary detection described above, some embodiments may allow a user to fine tune or adjust the boundary 802 and/or corner edges 804. In such embodiments, a user of a system implementing method 700 may be presented with a user interface substantially depicting the elements of FIG. 8, understood to reflect the layout of the 3D space actually scanned. With this user interface, the user may be able to adjust the location of, or add or subtract, the corner edges 804, as well as move or otherwise adjust a portion or all of boundary 802. It will be understood that adjustments to boundary 802 and corner edges 804 may interact with each other, e.g. deleting a corner edge 804 may cause a segment of boundary 802 defined by the deleted corner edge 804 to snap to a new corner edge 804. For example, if corner edge 804*b* is removed, the boundary 802 would snap to new segment 810, running to existing corner edge 804*d*. Likewise, if corner edge 804*b* did not previously exist, adding in a corner edge 804*b* to segment 810 and dragging it to the position of 804*b* indicated in FIG. 8 would result in the configuration of boundary 802 indicated in FIG. 8.

Figure 9:
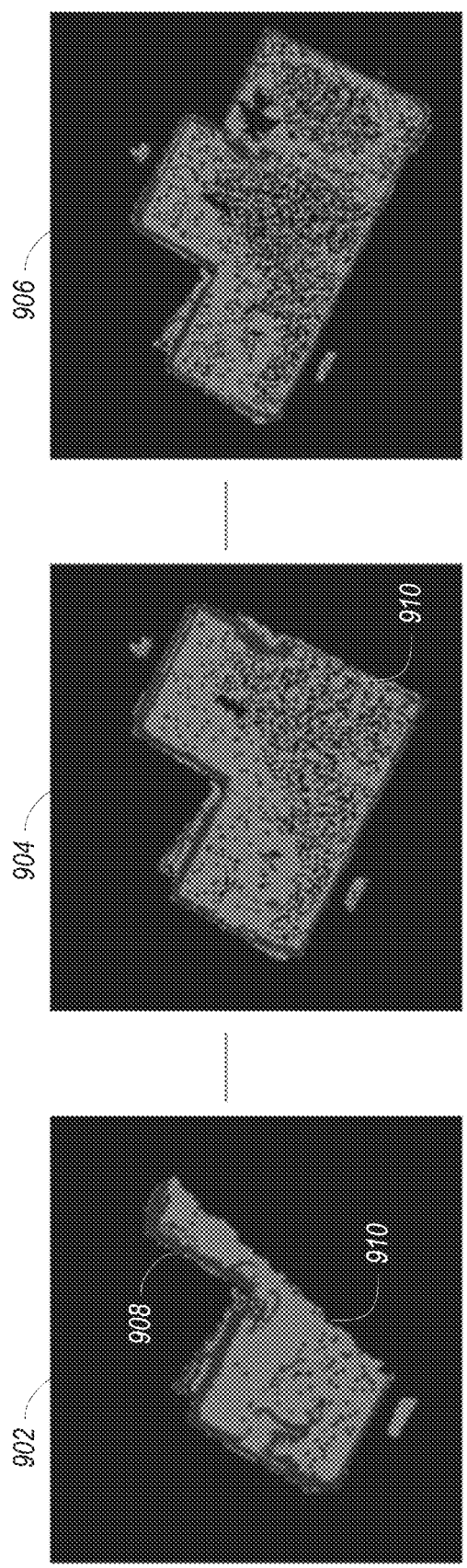
FIG. 9 depicts a progressive generation of the floorplan of FIG. 8 and when a complete scan of the corresponding 3D space is achieved, according to various embodiments.

FIG. 9 further illustrates how the user interface can assist a user in completing a "closed loop" scan. A scan is considered to be a closed loop when the scanning device, such as device 102, captures a 360 degree view of the captured 3D space, such that there are no boundaries that have not been imaged and for which depth data has not been obtained. Whether a scan is a closed loop may be ascertained from positional information obtained from the scanning device, such as motion data from an inertial measurement unit or other combination of gyroscopes, accelerometers, and/or magnetic compass, that tracks motion of the device in space and can judge based on angular change and/or compass heading whether the device has traveled, and thus imaged, a full circle. A closed loop scan is desirable because it not only allows for a complete layout of a 3D space, but also ensures that any measurements are accurate. A partial, or "open loop" scan may have imprecise angles in corner edges due to device error which could be corrected in a closed loop scan.

In image 902, a partial, or open loop scan is depicted, where boundary 908 is visible, but does not fully encompass the scanned 3D space. Thus, a partial or ragged edge 910 is visible that lacks the boundary indication 908, indicating the part of the 3D space that has not been completely scanned. The interface accordingly provides the user with feedback of where to position the capturing device to continue scanning the entire 3D space. Image 904 shows further development of the scan, with more of the room and associated boundary 908 captured, but with a ragged edge 910 still visible. Finally, in image 906 a complete closed loop scan is depicted, with boundary 908 running around the entire perimeter of the captured space. Where the interface updates in real time, such as in the execution of method 700 described above, the interface will incrementally towards image 906 as more portions of the space are scanned or captured that were not previously captured. As the user moves into areas not previously scanned and/or points the device to newly captured areas, the interface updates and expands to reflect the captured space.

It will be understood that the concept of a closed loop scan, in embodiments, may only apply to an enclosed 3D volume with a floor surface that is in some way bounded on all sides by a wall or other relatively vertically inclined boundary surface. An open and unenclosed space, such as a park or a field that is not enclosed, would likely never indicate a boundary, or would only indicate boundaries to the extent that a portion of the space is enclosed, e.g. a partial fence or wall in various locations. For some spaces, such as a parking lot, a fence may enclose most of the space, but with gaps left open where a drive way or entrance is left open. In such spaces, a full closed loop scan would similarly not be possible, as the drive way or entrance would always be indicated by a ragged edge, as boundary detection depends on detecting a wall or other structure extending up from the ground or floor.

Method 500, described above, can be employed for closed loop, partially open, and/or open loop scans. However, with partially or fully open loop scans, boundaries may not be capable of automatic identification. A user may instead be required to identify the limits of the desired space to capture. Manual boundary marking, as described above with respect to FIG. 8, may be employed by a user with a user interface who can directly enter the boundaries of the desired space to scan, essentially comparable to designating a region of interest within a larger captured spaced. In some embodiments, a user may be able to prospectively mark boundaries outside of the currently captured area (the black areas devoid of depth data depicted in FIGS. 8 and 9). Because disclosed embodiments maintain a scale of the captured data that reflects the actual physical dimensions of the captured space, the capturing device, employing method 500, may be able to indicate on the user interface when the user has captured data up to the designated boundary. In such embodiments, a user can be guided to ensure a full capture of a region of interest even in open loop or partially open loop environments, similar to a capture of a closed loop scan.

Figure 10:
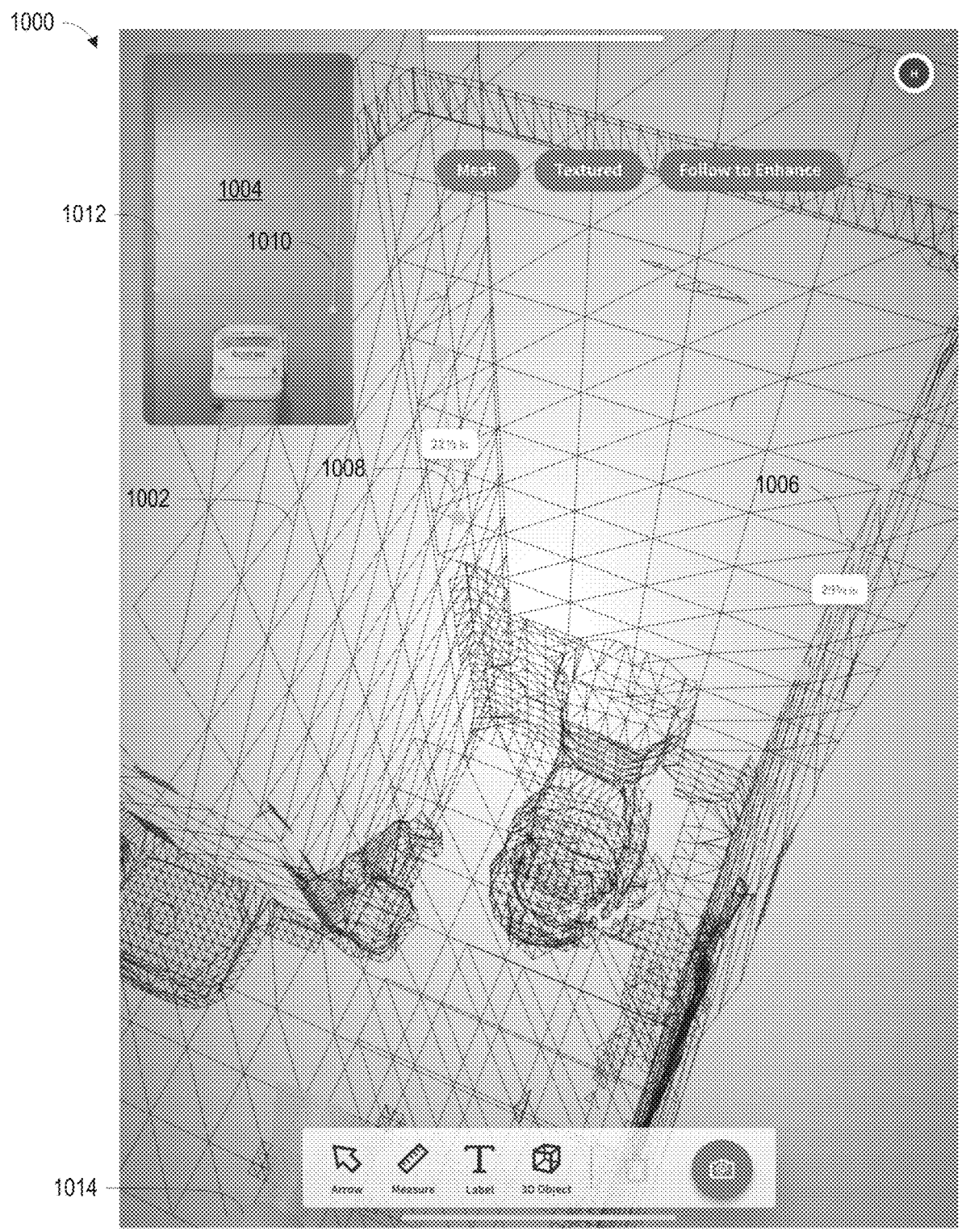
FIG. 10 depicts an example interface depicting a mesh view and corresponding camera view with measurement markers where the views are synchronized, according to various embodiments.

FIG. 10 depicts an example interface 1000 that allows for taking measurements within the context of a 3D mesh 1002 and layout, as opposed to a 2D layout similar to that depicted in FIGS. 8 and 9. Here, the mesh 1002 constitutes part of the virtual reconstruction or metaverse of the captured 3D space, in this example, a bathroom. In embodiments, the mesh 1002 is comprised of a plurality of interlocked triangles, and may be created using a process flow 200, as described above. A camera view 1004 is presented in an in-set window, which can be synchronized with the view of the mesh 1002. A camera indicator 1014 is present near the bottom of the interface to indicate the camera placement within the mesh 1002 that creates the corresponding camera view 1004. It should be appreciated that, as used here, the terms "top" and "bottom" may be relative, and not necessarily in reference to a ground plane.

Two measurements marks 1006 and 1008 are visible in the mesh 1002, with corresponding measurement marks 1010 and 1012, respectively, visible in the camera view 1004. The measurement marks may be placed by a user to take specific measurements of structures within the virtual reconstruction, which will correspond to the physical dimensions of the captured space, as described elsewhere above. The measurement marks 1006 and 1010 are synchronized, as are measurement marks 1008 and 1012. Adjustment of the marks in one view will automatically be reflected in the other view. Furthermore, it should be appreciated that the perspective of the mesh 1002 may be altered, e.g. the mesh 1002 may be moved or rotated to see different angles, while the camera view 1004 may remain stationary or move independently from the perspective of mesh 1002. The camera indicator 1014 may, in embodiments, rotate and move according to the movement of camera 104 of user device 102, as detected by spatial sensors 106, within the mesh 1002. The camera view 1004 may be moved or rotated independently from mesh 1002, e.g. in response to the detected movements of the capturing camera 104, in which case the camera indicator 1014 would move within the mesh 1002 to indicate the new perspective point of view. Alternatively, depending on how a given embodiment implements the interface 1000, the camera view 1004 may be directly moved and/or the camera indicator 1014 may be moved within the mesh 1002, with the camera view 1004 updating as the camera indicator 1014 is moved within the mesh 1002 (e.g. camera view 1004 may, in embodiments, be decoupled from the corresponding actual motion of capturing camera 104 as detected by spatial sensors 106).

The synchronization between the two views, the mesh 1002 and the camera view 1004, which includes synchronization of the various measurement marks 1006 and 1008 with corresponding marks 1010 and 1012, can allow a user to better and more accurately ascertain what is being measured within the virtual reconstruction, by allowing the virtual reconstruction to be simultaneously visualized in two different fashions, with the measurement marks overlaid in each visualization and remaining in synchronization.

Figure 11:
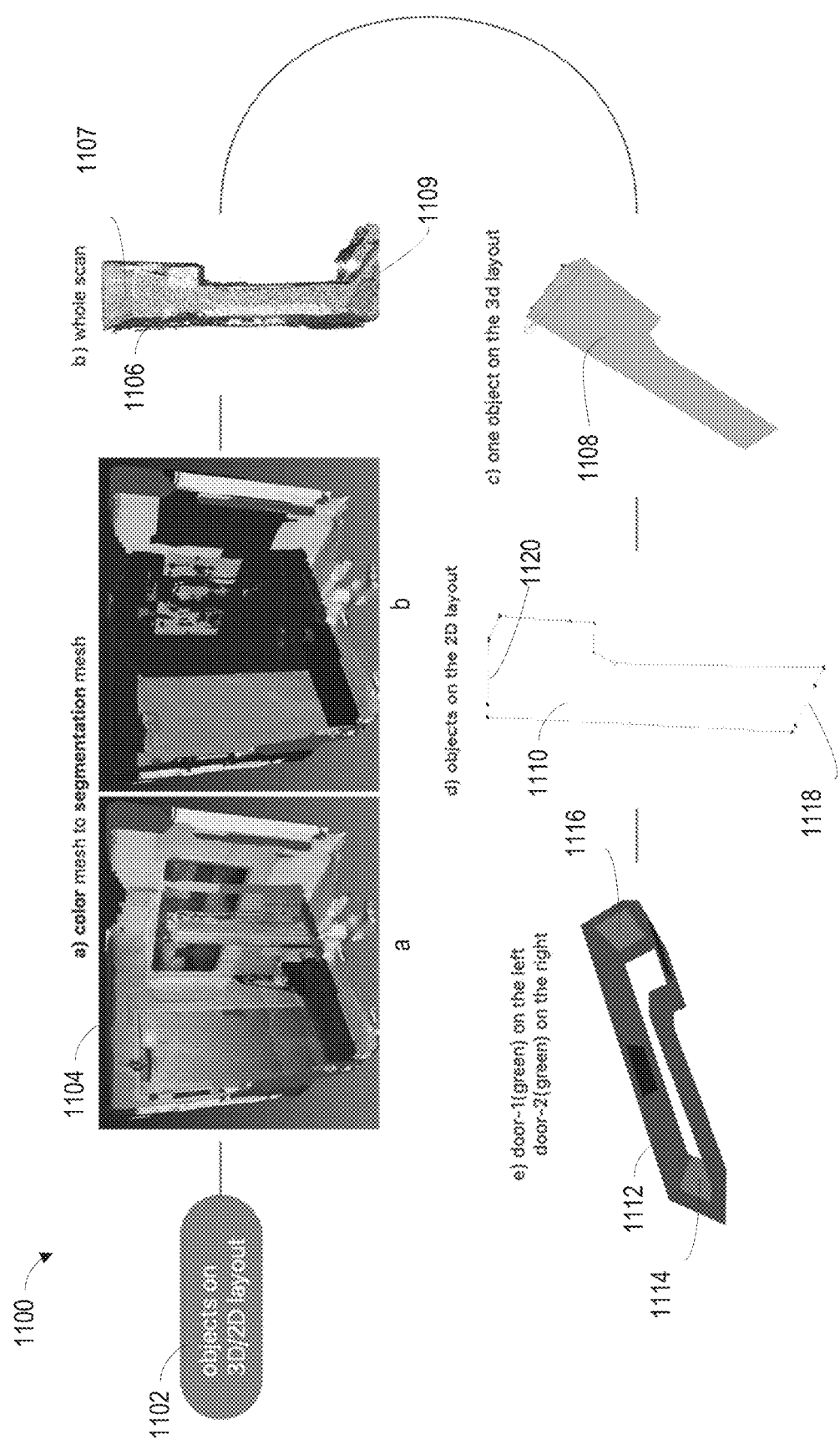
FIG. 11 depicts a process flow for segmentation of objects found along planes and boundaries, and an updating of 2D and 3D layouts with the segmented objects positioned to correspond to their physical position in the 3D space, according to various embodiments.

FIG. 11 illustrates an example process flow 1100 for the segmentation of a virtual reconstruction of a captured 3D space. Process flow 1100 may be performed by a system 100, with a mesh generated via process flow 200 and 2D or 3D layout generated via method 300 or method 500, in various embodiments. As with method 300, portions of the process flow may be omitted, changed, reordered, or additional actions added, depending upon the needs of a given implementation or embodiment. Process flow 1100 may address virtual reconstructions where planes such as walls have features or structures that are difficult to distinguish from the overall plane within the point cloud. For example, doors, windows, paintings, and other panels that do not significantly protrude or otherwise stand out from the wall surface may not be readily detected with a plane detection algorithm, although a user may want or need to have such structures identified to create accurate measurements. Consequently, these structures, or segments, need to be identified so that an accurate layout can be generated that reflects the true nature of the captured 3D space.

Beginning in block 1102, objects within a 3D or 2D layout are detected and recognized within a point cloud or 3D mesh in a segmentation process. These objects are segmented out, viz. their location and dimensions within the point cloud are determined. The segmentation process may be carried out by the AR interface on the capturing device, such as ARkit that may run on user device 102. When so provided, the AR interface may provide information about recognized objects and their associated positions within the point cloud or 3D mesh provided by the AR interface. In other embodiments, object detection algorithms may be employed to provide segmentation. In still other embodiments, deep learning or a neural network may be trained to recognize and segment out structures from planes in a point cloud. Other techniques may be employed that are now known or later developed, depending on the requirements of a given implementation.

In block 1104, a color 3D mesh is represented in the left image a, with a corresponding segmentation mesh represented in the right image b. The example meshes show a door and a painting, which are visible in both meshes. The segmentation provided by the capturing device in block 1102 allows the features of the door and painting to be localized onto the wall planes, e.g. placed at the location on the plane represented by the point cloud that corresponds with the location of the door and painting on the actual wall or walls of the captured 3D space, despite an object in front of the picture, visible in image a.

In block 1106, a top-down point cloud of the captured 3D space is seen. As may be seen, the doors of the initial colour mesh at 1104 may be seen at 1107 and 1109. Also depicted at 1106 is the painting that may be seen on the walls of the depiction at 1104, however such painting is not labelled herein for the sake of clarity and lack of clutter.

In block 1108, a 3D layout is generated from the point cloud depicted in block 1106, such as via method 300 and process flow 400, described above. Segmentation provided by the AR interface of the capturing device (or another suitable method) is incorporated into the 3D layout, which allows an object, a door in the depicted image as highlighted in green at the upper right of the image, to be identified within a boundary plane, namely, a wall. Because the segmentation information allows the identified door to be localized within the point cloud, door can be overlaid upon the 3D layout, which corresponds to the point cloud and the physical dimensions of the captured 3D space.

In block 1110, a 2D layout, which may be generated from the 3D layout as described in method 300 and method 500, can be overlaid with the identified door at 1120. Specifically, door 1120 may correspond to door 1107 of element 1106, or the highlighted door at 1108. Depending on how the 2D layout is presented, this may be signified by markers on an edge that denote the corresponding position along the edge where the door is positioned. Furthermore, if the door can be recognized as such by object recognition, in some embodiments, a symbol for a door can be inserted, such as the door symbol commonly used in architectural drawings or blueprints. In other embodiments, a user-defined symbol may be employed, or the markers may be highlighted or flagged to indicate the presence of a detected segment.

It will be noted that although embodiments are described with respect to generate the 2D layout at 1110 based on the 3D mesh from 1104, in other embodiments the 2D layout at 1110 may be generated based on alternative data such as a 3D voxel (e.g., the 3D voxel described with respect to FIG. 7). More generally, the embodiment herein is considered as one embodiment, and other embodiments may include variations such as the use of a voxel rather than a mesh.

As previously noted, a second door 1109 may be identified at 1106 at the bottom portion of the image of that block. Although the second door is not expressly depicted at 1108 for the sake of brevity herein, it will be noted that the image of block 1108 may include a representation of the second door 1109. The second door 1109 may then be represented at 1118 in block 1110. Similarly to the door related to element 1120, it will be understood that, in some embodiments, a symbol for a door may be inserted, a user-defined symbol may be employed, the markers may be highlighted or flagged, etc.

Finally, in block 1112, a 3D layout indicating several segments is visible, as process flow 1100 may be performed iteratively. In the image for block 1112, two doors 1114 and 1116, which respectively correspond to the doors at 1118 and 1120, are rendered on either side of the elongated hallway, along with a painting on the long hallway wall. As discussed above, these features would otherwise be difficult to distinguish from the walls detected in the point cloud, and so require a segmentation process to be identified and localized.

In some embodiments, when the various images (e.g., the 3D image at block 1112 or the 2D image at block 1110) are rendered, then in some embodiments they may be rendered in a user-manipulable or user-interactive way. In one specific embodiment, the user may able to interact with the 2D image at 1110 or the 3D image at 1112. Such interaction may take the form of interacting with the elements 1114, 1116, 1118, or 1120. For example, the user may be able to "touch" the elements in the image (e.g., if the display is a touchscreen on a mobile device), maneuver a pointer to the elements in the image (e.g., using a mouse), or some other way of highlighting or selecting the "doors." In this case, the image may change to additionally or alternatively include a representation of the selected element. Specifically, the 2D or 3D image may change to additionally or alternatively show a picture of the selected element as a contextual representation.

Figure 12:
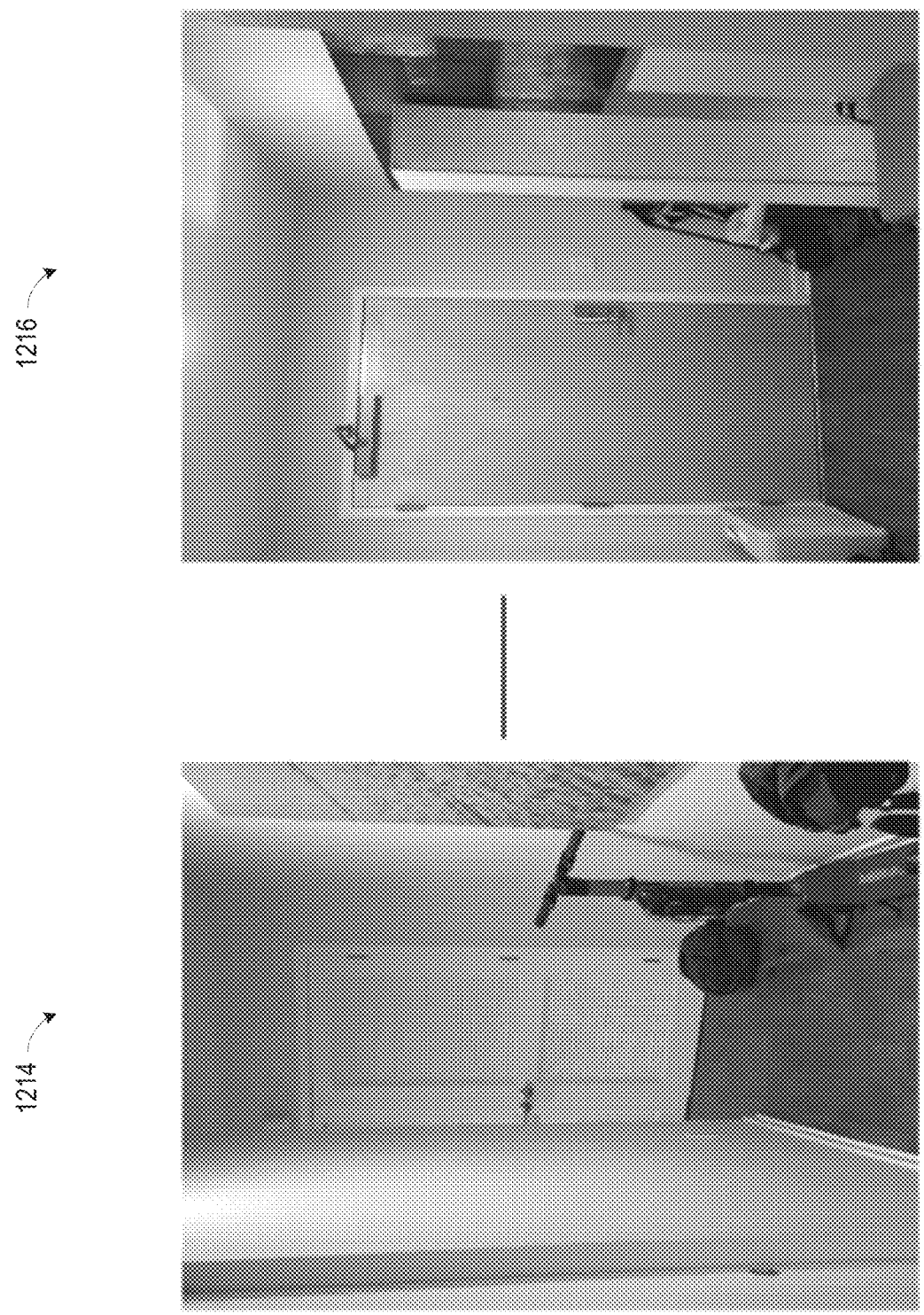
FIG. 12 depicts an example of a contextual representation of an element of a 2D image or a 3D image, in accordance with various embodiments.

An example of a contextual representation of an element of the 2D image at 1110 or the 3D image at 1112 is depicted in FIG. 12, in accordance with various embodiments. Specifically, FIG. 12 depicts an image of a door at 1214, which may correspond to door 1114/1118. Additionally, FIG. 12 depicts an image of a door at 1216, which may correspond to door 1116/1120. To use a concrete example, if the user selected (e.g., touched, clicked-on, etc.) the representation of the door in the 2D image (e.g., element 1118) or the representation of the door in the 3D image (e.g., element 1114), then the image(s) may change to additionally or alternatively display the image of the door at 1214.

It will be noted that the images at 1214 and 1216 may include the door, but may also include additional portions of an image surrounding the door (e.g., part of the wall, part of the floor, part of the ceiling, other objects in the vicinity of the door, etc.). This display of additional information may be desirable because the additional context may help a user to understand or locate the door in the 3D space if the user visits the 3D space. In other words, the additional context from the image may provide context to a user to navigate the 3D space. In some embodiments, the displayed elements may not only be photographic in nature, but may be videographic. For example, in some embodiments the additional elements depicted in response to selection of an element may include a number of frames captured from the initial camera sweep, or other pre-recorded videographic elements that may assist with presenting context to a user.

Figure 13:
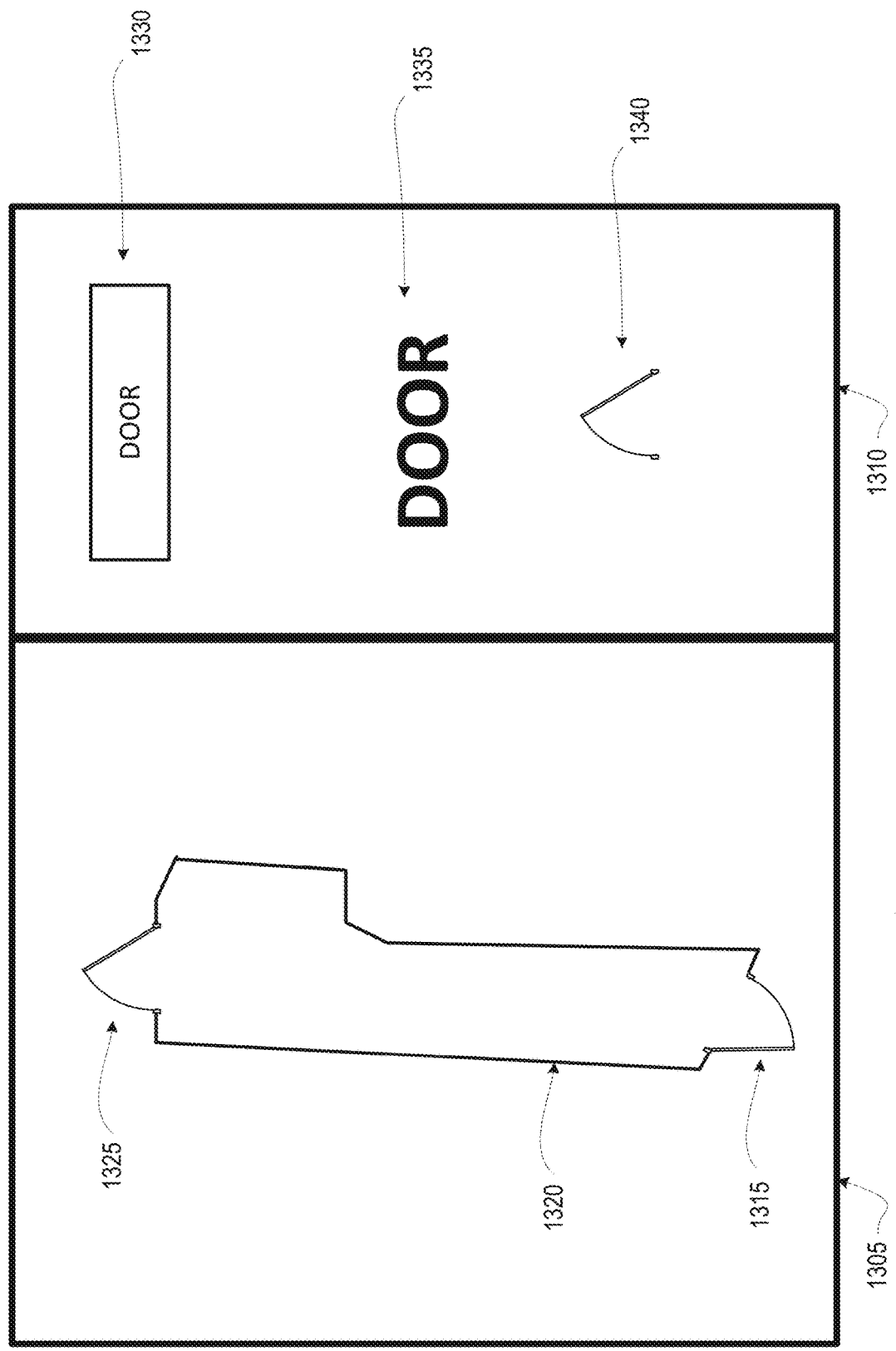
FIG. 13 depicts an example graphical interface on which an image such as a 2D image or a 3D image may be depicted, in accordance with various embodiments.

FIG. 13 depicts an example graphical interface 1300 on which an image such as the 2D image at 1110 or the 3D image at 1112 may be depicted, in accordance with various embodiments. Specifically, FIG. 13 depicts an example of a graphical interface 1300 which may be presented to a user. As an example, the graphical interface 1300 may be displayed to a user on a computer monitor, a display of a portable electronic device (e.g., a PDA, a mobile telephone, or a laptop), a kiosk, or some other type of display. It will be noted that the specific configuration of elements, the relative sizes of elements, the number of elements, etc. are only shown in FIG. 13 for the sake of discussion and description of concepts herein. Other embodiments may include more or fewer elements, elements arranged in a different configuration, elements with different sizes or relative sizes, etc. It will also be noted that the embodiment depicted in FIG. 13 may be depicted or described with respect to a 2D image such as the image at 1110, however in other embodiments FIG. 13 may additionally or alternatively be implemented using a 3D image such as the image depicted at 1112.

The graphical interface 1300 may include two portions 1305 and 1310. In portion 1305, a 2D image 1320 may be depicted. The 2D image 1320 may generally correspond to the 2D image at 1110. However, as may be seen, the doors at 1120 and 1118 may be replaced with graphical symbols of a door at 1325 and 1315 rather than the coloured segments that are used to depict the doors 1118/1120 at 1110. Specifically, the door 1325 may correspond to the door 1120, and the door 1315 may correspond to the door 1118. Generally, and as described above, it will be recognized that the specific shape or size of the symbol that is used to represent an object such as a door may vary, and may be different in different embodiments. The specific size/shape/format/etc. of the graphical representation of the object may be based on, for example, the preference of a developer that is programming the computer program that generates the image, the preference of a user of the program, the type of object being displayed, or some other factor.

Portion 1310 may include one or more user-interactable elements such as one or more of elements 1330, 1335, and 1340. Specifically, these user-interactable elements may be one-dimensional (1D) or 2D elements which a user may use to interact with the 2D or 3D image in portion 1305.

A first such element may be a text search box as depicted at 1330. Specifically, a user may be able to enter (e.g., through a keypad displayed in the user interface, a keyboard of the mobile device, a keyboard connected to the mobile device, dictation into a microphone that is then processed by voice recognition, etc.) one or more words or phrases. The word may be associated with one or more objects or categories of objects (e.g., a door). If the object or objects are displayed in portion 1305, then that object may be highlighted in some way (e.g., through manipulation of the image such as a change in colour, brightness, and/or size). For example, if the user entered a word or phrase such as "door," "entrance," "exit," "portal," etc. into text search box 1330, then doors 1315 and 1325 may be highlighted in some way.

A second such element may be a selectable word as depicted at 1335. For example, the user may be able to access a drop-down type interface or some other interface that displays one or more words that may associate with one or more objects. In some embodiments, multiple words may be associated with the same object or categories of objects (e.g., the words "door," "entrance," "exit," "portal," etc. may all be associated with one or both of doors 1325/1315). In other embodiments, a single word may be displayed for respective objects or categories of objects (e.g., the word "door" may be associated with doors 1315/1325). If that word or phrase is selected, then doors 1315 and 1325 may be highlighted.

Another such element may be a graphical representation of the object or classification of objects as shown at 1340. If a user interacts with the graphical representation (e.g., by clicking on the object, selecting the object on a touchscreen, etc.), then the object or objects with which that graphical representation is associated may be highlighted in some form. Similarly to element 1335, a number of graphical representations of various objects or classifications of objects may be presented to the user in a drop-down format, a grid-based format, or some other type of menu or format. In this embodiment, if the user selected the graphical element displayed at 1340, then doors 1315 and 1325 may be highlighted in portion 1305.

In some embodiments, user input may be received at portion 1305 as well. For example, if the user selected the door 1325 (e.g., by clicking on the door, selecting the door on a touchscreen, etc.), then the door 1325 may be highlighted in some way. In some embodiments, selection of one door (e.g., the door 1325) may highlight a plurality of doors in the image (e.g., the doors 1315 and 1325).

Figure 14:
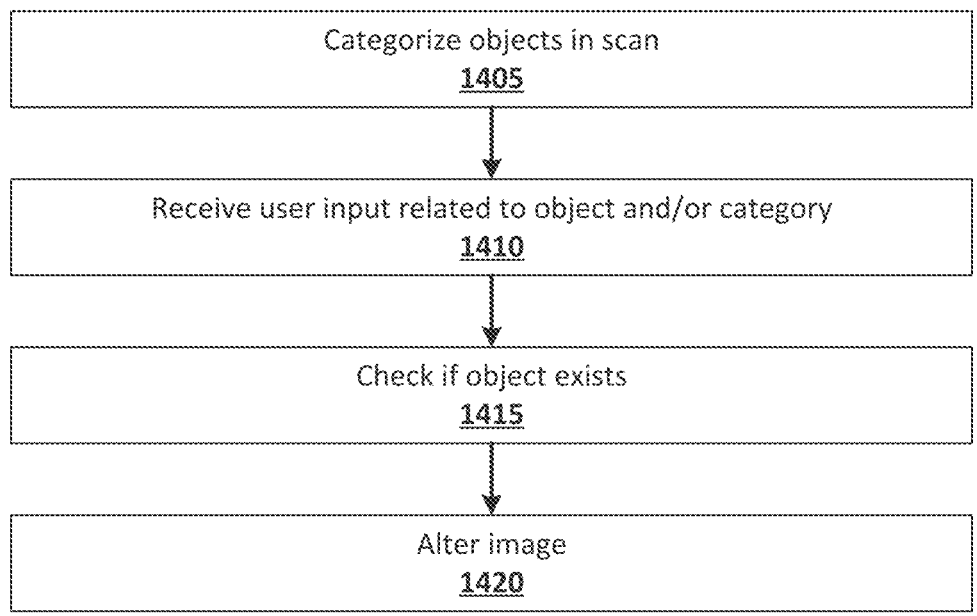
FIG. 14 depicts an example technique that may be used to search for the existence or location of one or more objects in a 2D or 3D representation of a 3D space, in accordance with embodiments herein.

FIG. 14 depicts an example technique that may be used to search for the existence or location of one or more objects in a 2D or 3D representation of a 3D space, in accordance with embodiments herein. Specifically, with respect to FIG. 14, it may be desirable to be able to check whether a specific object exists in the 3D space, and if so, where that object is located. FIG. 14 depicts an example technique by which such a search may be performed. It will be understood that the described technique is for the sake of description of one embodiment herein, and other embodiments may have more or fewer elements, elements arranged in a different order than depicted, etc.

Generally, it will be understood that the process of FIG. 14, and other similar images herein, may be performed by an electronic device such as a mobile device such as a mobile phone or smartphone, or another electronic device such as a laptop computer, a desktop computer, a kiosk, some type of server, etc. In some embodiments, certain elements of the process depicted at FIG. 14 may be performed at different electronic devices (e.g., element 1405 may be performed by a server such as server 110 while receipt of user input is performed on a user device such as element 114 or 116).

The process may include categorizing, at 1405, objects in a mesh (e.g., the mesh at 1104) into different classifications or categories. For example, each object in the scan may be given a unique identifier (e.g., a hash, a number, etc.), and those numbers may be classified into different groups. One such group may be for objects that are, or are related to, "doors." Another such group may be for objects that are, or are related to, "floor." Other such classifications may be or include, for example, "wall," "column," "beam," "window," "table," "chair," "sofa," "bookcase," "board," etc. In some embodiments, a catch-all type classification may be "clutter." It will be noted that these are just examples of such classifications, and other embodiments may have more, fewer, and/or different classifications.

A user input may then be received at 1410. The user input may be received in a manner as described with respect to FIG. 13, described above. As noted, the user input may be based on a text search box, selection of a text-based icon, selection of a graphical icon, or some other manner. The user input may relate to a specific object (e.g., selection of a particular object in the 2D or 3D image), or selection of a category of objects. In some embodiments, the user input may additionally or alternatively be related to selection of an image of the object, such as user selection of doors 1315 or 1325 as described above.

The user input may be compared against the object classification to see if the object exists at 1415. For example, one or more of the unique identifiers or group classifications may be compared to an identifier associated with the word, graphic, 2D object, or 3D object associated with the user input. If the object exists, then the image may be altered at 1420 in some manner such as by highlighting one or more objects associated with the user input. For example, in some embodiments an additional image of one or more objects (e.g., the doors depicted in FIG. 12) may additionally or alternatively be depicted. In some embodiments, the depiction of the object in the 2D or 3D image may be highlighted as described above.

Figure 15:
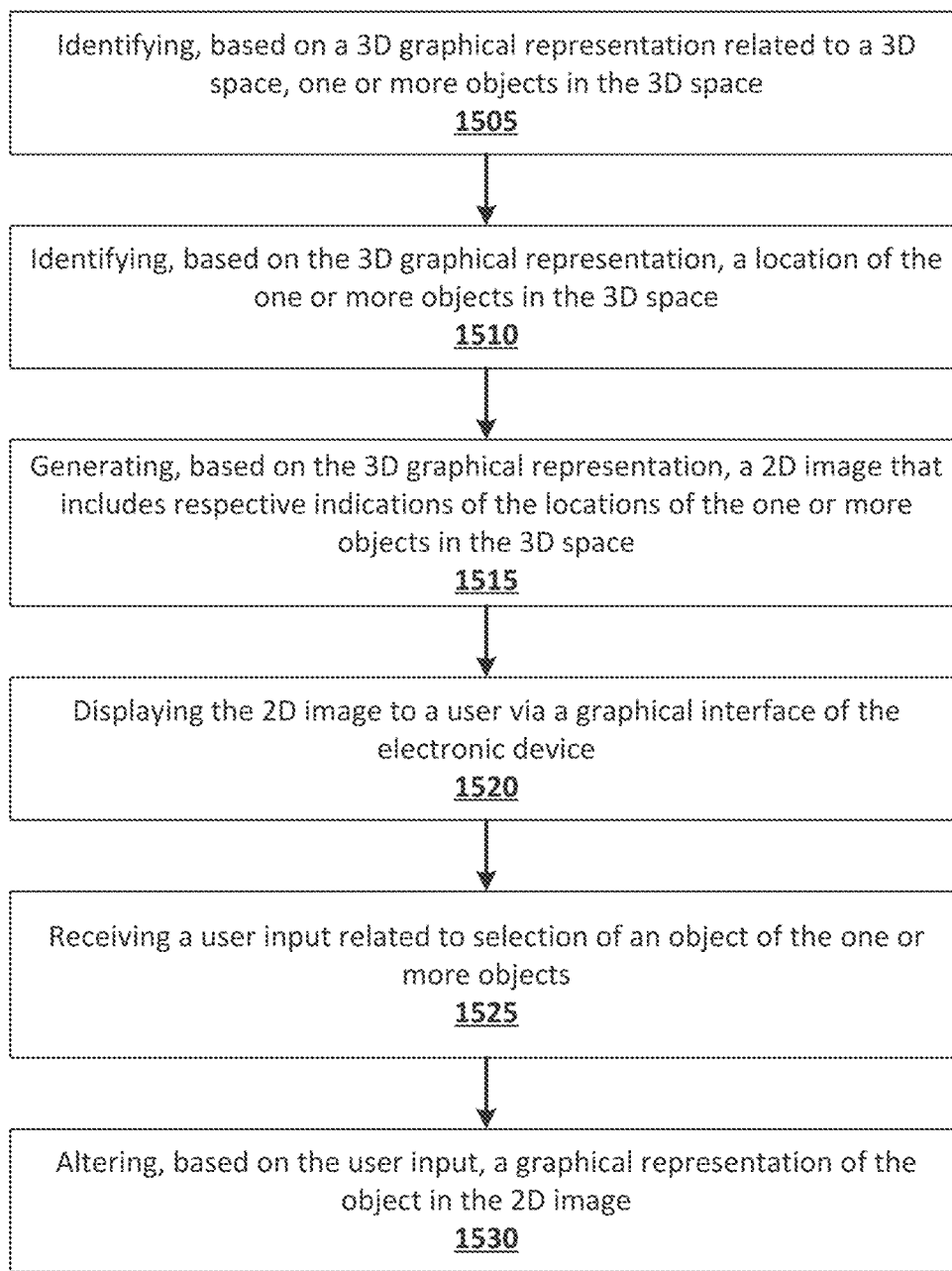
FIG. 15 depicts an example technique that may be used to identify a location of one or more objects in a 3D space and display a representation of the object in a 2D or 3D image in a user interface, in accordance with embodiments herein.

FIG. 15 depicts an example technique that may be used to identify a location of one or more objects in a 3D space and display a representation of the object in a 2D or 3D image in a user interface, in accordance with embodiments herein. Similarly to other techniques or process flows described herein, it will be understood that the described technique is for the sake of description of one embodiment herein, and other embodiments may have more or fewer elements, elements arranged in a different order than depicted, etc.

The technique may include identifying, at 1505 based on a 3D graphical representation related to a 3D space, one or more objects in the 3D space. The 3D graphical representation may be, for example, a mesh such as the mesh described with respect to element 1104, and/or some other 3D graphical representation of a 3D space.

The technique may further include identifying, at 1510 based on the 3D graphical representation, a location of the one or more objects in the 3D space. Such identification may be similar to that described with respect to elements 1106, 1108, and/or some other element herein.

The technique may further include generating, at 1515 based on the 3D graphical representation, a 2D image that includes respective indications of the locations of the one or more objects in the 3D space. Such a 2D image may be similar to, for example, the 2D image depicted at 1110, or some other 2D image depicted or discussed herein.

The technique may further include displaying, at 1520, the 2D image to a user via a graphical interface of the electronic device. As noted, such display may be on a display of an electronic device such as a computer, a display or touchscreen of a kiosk, a display or touchscreen of a mobile device, etc.

The technique may further include receiving, at 1525, a user input related to selection of an object of the one or more objects. Such user input may be similar to the various input possibilities described with respect to FIG. 13. For example, the user input may include selecting a representation of the object in the 2D image itself, entering an input into a textbox, selecting a word or graphic related to the objects, etc. As previously noted, the user input may relate to a classification of various objects (e.g., one or more doors in the image, one or more walls, one or more columns, one or more elements of clutter, etc.).

The technique may further include altering, at 1530 based on the user input, a graphical representation of the object in the 2D image. Such alteration may include changing a colour, size, brightness, or highlight of the object in the 2D image. In some embodiments, such alteration may include additionally or alternatively include displaying a photographic representation of the image (e.g., the doors of FIG. 12). Other embodiments may be possible.

Figure 16:
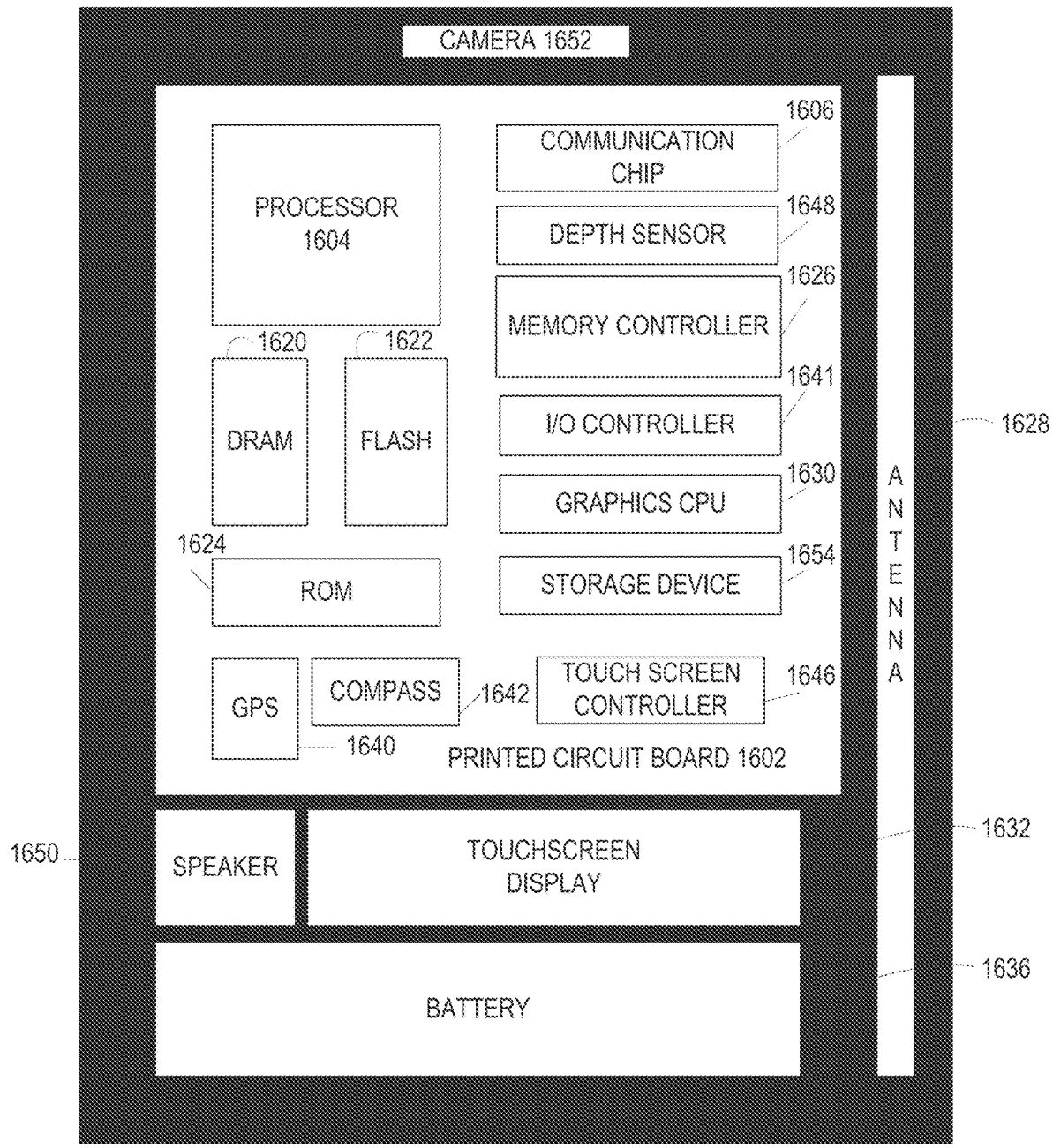
FIG. 16 is a block diagram of an example computer that can be used to implement some or all of the components of the disclosed systems and methods, according to various embodiments.

FIG. 16 illustrates an example computer device 1600 that may be employed by the apparatuses and/or methods described herein, in accordance with various embodiments. As shown, computer device 1600 may include a number of components, such as one or more processor(s) 1604 (one shown) and at least one communication chip 1606. In various embodiments, one or more processor(s) 1604 each may include one or more processor cores. In various embodiments, the one or more processor(s) 1604 may include hardware accelerators to complement the one or more processor cores. In various embodiments, the at least one communication chip 1606 may be physically and electrically coupled to the one or more processor(s) 1604. In further implementations, the communication chip 1606 may be part of the one or more processor(s) 1604. In various embodiments, computer device 1600 may include printed circuit board (PCB) 1602. For these embodiments, the one or more processor(s) 1604 and communication chip 1606 may be disposed thereon. In alternate embodiments, the various components may be coupled without the employment of PCB 1602.

Depending on its applications, computer device 1600 may include other components that may be physically and electrically coupled to the PCB 1602. These other components may include, but are not limited to, memory controller 1626, volatile memory (e.g., dynamic random access memory (DRAM) 1620), non-volatile memory such as read only memory (ROM) 1624, flash memory 1622, storage device 1654 (e.g., a hard-disk drive (HDD)), an I/O controller 1641, a digital signal processor (not shown), a crypto processor (not shown), a graphics processor 1630, one or more antennae 1628, a display, a touch screen display 1632, a touch screen controller 1646, a battery 1636, an audio codec (not shown), a video codec (not shown), a global positioning system (GPS) device 1640, a compass 1642, an accelerometer (not shown), a gyroscope (not shown), a depth sensor 1648, a speaker 1650, a camera 1652, and a mass storage device (such as hard disk drive, a solid state drive, compact disk (CD), digital versatile disk (DVD)) (not shown), and so forth.

In some embodiments, the one or more processor(s) 1604, flash memory 1622, and/or storage device 1654 may include associated firmware (not shown) storing programming instructions configured to enable computer device 1600, in response to execution of the programming instructions by one or more processor(s) 1604, to practice all or selected aspects of any of the process flows, interface, or techniques described with respect to FIGS. 1-15, herein. In various embodiments, these aspects may additionally or alternatively be implemented using hardware separate from the one or more processor(s) 1604, flash memory 1622, or storage device 1654.

The communication chips 1606 may enable wired and/or wireless communications for the transfer of data to and from the computer device 1600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1606 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1600 may include a plurality of communication chips 1606. For instance, a first communication chip 1606 may be dedicated to shorter range wireless communications such as Wi-Fi and Bluetooth, and a second communication chip 1606 may be dedicated to longer range wireless communications such as GPS, EDGE, GPRS, CDMA, WiMAX, LTE, Ev-DO, and others.

In various implementations, the computer device 1600 may be a laptop, a netbook, a notebook, an ultrabook, a smartphone, a computer tablet, a personal digital assistant (PDA), a desktop computer, smart glasses, or a server. In further implementations, the computer device 1600 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 17 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1702 may include a number of programming instructions 1704. Programming instructions 1704 may be configured to enable a device, e.g., computer 1600, in response to execution of the programming instructions, to implement (aspects of) any of the techniques, methods, process flows, or interfaces described with respect to any of FIGS. 1-15, herein. In alternate embodiments, programming instructions 1704 may be disposed on multiple computer-readable non-transitory storage media 1702 instead. In still other embodiments, programming instructions 1704 may be disposed on computer-readable transitory storage media 1702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. An electronic device comprising:
   one or more processors; and
   one or more non-transitory computer-readable media comprising instructions that, upon execution of the instructions by the one or more processors, are to cause the electronic device to:
   identify a three-dimensional (3D) graphical representation of a physical 3D space, wherein the physical 3D space includes one or more physical objects;
   generate, based on the 3D graphical representation, a two-dimensional (2D) image that includes respective instances of respective physical objects of the one or more physical objects;
   display the 2D image to a user in a first portion of a graphical interface of the electronic device;
   receive a user input that indicates a selection, by the user in a second portion of the graphical interface, of a class of physical object of the one or more physical objects; and
   alter, based on the user input, respective instances of a subset of physical objects of the one or more physical objects in the 2D image, wherein physical objects of the subset of physical objects correspond to the class of physical object.

2. The electronic device of claim 1, wherein the 3D graphical representation is based on one or more images of the physical 3D space taken by a camera of the electronic device or depth information of the physical 3D space.

3. The electronic device of claim 1, wherein the electronic device is a mobile electronic device.

4. The electronic device of claim 1, wherein the 2D instances of respective physical objects of the one or more physical objects include a color of a plurality of colors, wherein respective colors of the plurality of colors correspond to a respective different classifications of a plurality of classifications of the physical objects.

5. The electronic device of claim 1, wherein the 2D instances of respective physical objects of the one or more physical objects include a graphical symbol of a plurality of graphical symbols, wherein respective graphical symbols of the plurality of graphical symbols correspond to respective classifications of a plurality of classifications of the physical objects.

6. The electronic device of claim 1, wherein the 3D graphical representation is a 3D point cloud, a 3D mesh, or a 3D voxel.

7. One or more non-transitory computer-readable media comprising instructions that, upon execution of the instructions by one or more processors of an electronic device, are to cause the electronic device to:
   identify a three-dimensional (3D) graphical representation of a physical 3D space, wherein the physical 3D space includes one or more physical objects;
   generate, based on the 3D graphical representation, a two-dimensional (2D) image that includes respective instances of respective physical objects of the one or more physical objects;
   display the 2D image to a user in a first portion of a graphical interface of the electronic device;
   receive a user input that indicates selection, by the user a second portion of the graphical interface, of a class of physical object of the one or more physical objects; and
   alter, based on the user input, respective instances of a subset of physical objects of the one or more physical objects in the 2D image, wherein physical objects of the subset of physical objects correspond to the class of physical object.

8. The one or more non-transitory computer-readable media of claim 7, wherein the user input includes the user selecting a 2D indication of a location of the physical object.

9. The one or more non-transitory computer-readable media of claim 7, wherein the user input includes the user selecting an abstract 2D representation of the physical object.

10. The one or more non-transitory computer-readable media of claim 7, wherein the user input includes the user entering a text string related to the physical object in a search bar of the graphical interface; and
wherein the instructions are further to cause the one or more processors to perform a search related to the physical object based on the text string.

11. The one or more non-transitory computer-readable media of claim 7, wherein changing the representation of the physical object includes changing a brightness or color of the representation of the physical object.

12. The one or more non-transitory computer-readable media of claim 7, wherein changing the representation of the physical object includes displaying an image of the physical object in the physical 3D space.

13. The one or more non-transitory computer-readable media of claim 7, wherein changing the representation of the physical object includes changing a representation of the physical object and other objects in the 2D image that have a same classification as the physical object.

14. An apparatus comprising:
a camera to generate one or more images of a physical-three-dimensional (3D) space;
a graphical interface; and
one or more processors coupled with the camera and the graphical interface, wherein the one or more processors are to:
identify a three-dimensional (3D) graphical representation of a physical 3D space, wherein the physical 3D space includes one or more physical objects;
generate, based on the one or more images, a two-dimensional (2D) image that includes respective instances of respective physical objects of the one or more physical objects;
display the 2D image to a user in a first portion of the graphical interface;
receive a user input that indicates selection, by the user a second portion of the graphical interface, of a class of physical object of the one or more physical objects; and
alter, based on the user input, respective instances of a subset of physical objects of the one or more physical objects in the 2D image, wherein physical objects of the subset of physical objects correspond to the class of physical object.

15. The apparatus of claim 14, wherein the apparatus is a laptop computing device, a desktop computing device, or a server.

16. The apparatus of claim 14, wherein the 2D instances of respective physical objects of the one or more physical objects include a color of a plurality of colors, wherein respective colors of the plurality of colors correspond to a respective different classifications of a plurality of classifications of the physical objects.

17. The apparatus of claim 14, wherein the 2D instances of respective physical objects of the one or more physical objects include a graphical symbol of a plurality of graphical symbols, wherein respective graphical symbols of the plurality of graphical symbols correspond to respective classifications of a plurality of classifications of the physical objects.

18. The apparatus of claim 14, wherein the user input includes:
the user selecting the 2D instances of respective physical objects of the one or more physical objects;
the user selecting an abstract 2D representation of the physical object; or
the user entering a text string related to the physical object in a search bar of the graphical interface.

19. The apparatus of claim 14, wherein changing the representation of the object includes:
changing a brightness or color of the representation of the physical object;
displaying an image of the physical object in the 3D space; or
changing a representation of the physical object and other objects in the 2D image that have a same classification as the physical object.

20. The apparatus of claim 14, wherein the one or more processors are further to:
generate, based on the one or more images, a 3D graphical representation related to the physical 3D space;
identify, based on the 3D graphical representation, the one or more physical objects and respective locations of the one or more physical objects; and
generate, based on the 3D graphical representation, the identified one or more physical objects, and the respective locations of the one or more physical objects, the 2D image.

* * * * *